US012442218B2

(12) United States Patent
Fournier et al.

(10) Patent No.: US 12,442,218 B2
(45) **Date of Patent: *Oct. 14, 2025**

(54) DOOR LOCK WITH INDICATOR

(71) Applicant: Sargent Manufacturing Company, New Haven, CT (US)

(72) Inventors: Brian R. Fournier, Canton, CT (US); Daniel Gills, Nashville, TN (US); Thomas Harris, Charlotte, NC (US); Jeong Sik Kim, Daegu (KR); Yong Hyun Kim, Daegu (KR)

(73) Assignee: Sargent Manufacturing Company, New Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,116

(22) Filed: Sep. 29, 2023

(65) Prior Publication Data

US 2024/0076903 A1 Mar. 7, 2024

Related U.S. Application Data

(63) Continuation of application No. 17/228,947, filed on Apr. 13, 2021, now Pat. No. 11,808,055, which is a (Continued)

(30) Foreign Application Priority Data

Nov. 18, 2019 (KR) ........................ 10-2019-0147869
Jan. 28, 2020 (KR) ........................ 10-2020-0010025

(51) Int. Cl.
*E05B 41/00* (2006.01)
*E05B 1/00* (2006.01)
(Continued)

(52) U.S. Cl.
CPC .............. *E05B 41/00* (2013.01); *E05B 1/003* (2013.01); *E05B 17/226* (2013.01); *E05B 39/00* (2013.01)

(58) Field of Classification Search
CPC ........ E05B 1/003; E05B 17/22; E05B 17/226; E05B 39/00; E05B 41/00
See application file for complete search history.

(56) References Cited

U.S. PATENT DOCUMENTS 747,252 A * 12/1903 Smith ..................... E05B 41/00 40/907
1,337,401 A * 4/1920 Heberling ............... E05B 41/00 40/907
(Continued)

FOREIGN PATENT DOCUMENTS

KR 10-1458754 B1 11/2014

OTHER PUBLICATIONS

Office Action for Korean Application No. 10-2020-0010025, dated Mar. 24, 2020.

*Primary Examiner* — Christopher J Boswell
(74) *Attorney, Agent, or Firm* — Wolf, Greenfield & Sacks, P.C.

(57) ABSTRACT

Disclosed herein is a door lock configured to indicate the lock status of the door lock to nearby persons. In some instances, the door lock includes a locking mechanism with one or more actuators configured to act directly on an indicator such that the indicator indicates the lock status of the lock.

6 Claims, 29 Drawing Sheets

Related U.S. Application Data continuation-in-part of application No. 16/888,417, filed on May 29, 2020, now Pat. No. 11,359,408.

(60) Provisional application No. 63/037,397, filed on Jun. 10, 2020.

(51) Int. Cl.

| | |
|---|---|
| ***E05B 17/22*** | (2006.01) |
| ***E05B 39/00*** | (2006.01) |

(56) References Cited

U.S. PATENT DOCUMENTS

| | | | | |
|---|---|---|---|---|
| 2,315,102 | A | 3/1943 | Adams | |
| 2,455,208 | A | 11/1948 | Wirth | |
| 3,368,375 | A | 2/1968 | Russell et al. | |
| 4,490,999 | A | 1/1985 | Castle et al. | |
| 4,559,796 | A | 12/1985 | De Forrest, Sr. | |
| 4,854,061 | A | 8/1989 | Khoshkish | |
| 6,938,445 | B2 * | 9/2005 | Huang .................... | E05B 41/00 70/432 |
| 9,169,669 | B2 | 10/2015 | Clary et al. | |
| 9,845,620 | B2 | 12/2017 | Bronner | |
| 9,879,445 | B2 | 1/2018 | Gopalakrishnan et al. | |
| 10,563,425 | B2 | 2/2020 | Lunday | |
| 11,359,408 | B2 | 6/2022 | Kim et al. | |
| 11,486,163 | B2 | 11/2022 | Sweeney et al. | |
| 11,808,055 | B2 | 11/2023 | Fournier et al. | |
| 2008/0000277 | A1 | 1/2008 | Yu | |
| 2011/0016938 | A1 | 1/2011 | Chi | |
| 2019/0323264 | A1 | 10/2019 | Lunday | |
| 2020/0190856 | A1 | 6/2020 | Kaverina | |
| 2021/0148136 | A1 | 5/2021 | Kim et al. | |
| 2021/0230903 | A1 | 7/2021 | Fournier et al. | |

* cited by examiner

DOOR LOCK WITH INDICATOR

CROSS REFERENCE TO RELATED APPLICATIONS

This application is a continuation of and claims the benefit under 35 U.S.C. § 120 of U.S. application Ser. No. 17/228,947, filed Apr. 13, 2021 and titled “Indicator-Type Door Lock,” which is a continuation-in-part and claims the benefit under 35 U.S.C. § 120 of U.S. application Ser. No. 16/888,417, filed May 29, 2020 and titled “Indicator-Type Door Lock,” which claims priority to Korean Patent Application No. KR10-2020-0010025 filed on Jan. 28, 2020 and Korean Patent Application No. KR10-2019-0147869 filed on Nov. 18, 2019. This application also claims the benefit under 35 U.S.C. § 119(e) of U.S. Provisional Patent Application Ser. No. 63/037,397, filed Jun. 10, 2020 and titled “Cylindrical Door Lock with Indicator.” The preceding references are incorporated herein by reference in their entirety.

FIELD

Disclosed embodiments relate to door locks configured to indicate the status of the door lock.

BACKGROUND

Door locks (e.g., a deadbolt lock, a mortise lock, a cylindrical lock, or lock of other suitable type) are used to secure entryways and may be in an unlocked state, wherein a deadbolt and/or latch of the door lock is in a retracted or unlocked state enabling access or in a locked state, wherein the deadbolt and/or latch is in an extended or locked state such that access from one or both sides of the door is prevented.

SUMMARY

According to one aspect, an indicator type door lock includes a handle shaft having a handle for unlocking and a push button for locking. The door lock may further include a driving body mounted with the handle shaft and a door lock main body having a main body cover with at least one display portion displaying the locked state of the door lock to the outside and installed in front of the driving body. Moreover, the door lock may include an indicator member installed within the door lock main body to be pivoted to a certain radius and being exposed through the display portion and a turning drive member located within the handle shaft and rotated inside the handle shaft when the push button is pressed to pivot the indicator member.

According to another aspect, a cylindrical door lock includes a chassis, a locking mechanism coupled to the chassis, and a movable indicator operatively coupled to the locking mechanism. Additionally, the locking mechanism may include an actuator configured to act directly on the indicator to drive the indicator from a first position to a second position when the locking mechanism is transitioned from an unlocked state to a locked state.

According to another aspect, a cylindrical door lock includes a chassis, a locking mechanism comprising a tooth, and a first movable indicator configured to be acted directly on by the tooth. The locking mechanism may be configured to selectively transition between an unlocked state and a locked state, wherein the tooth is configured to drive the first indicator from a first position to a second position as the locking mechanism transitions from the unlocked state to the locked state.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1:
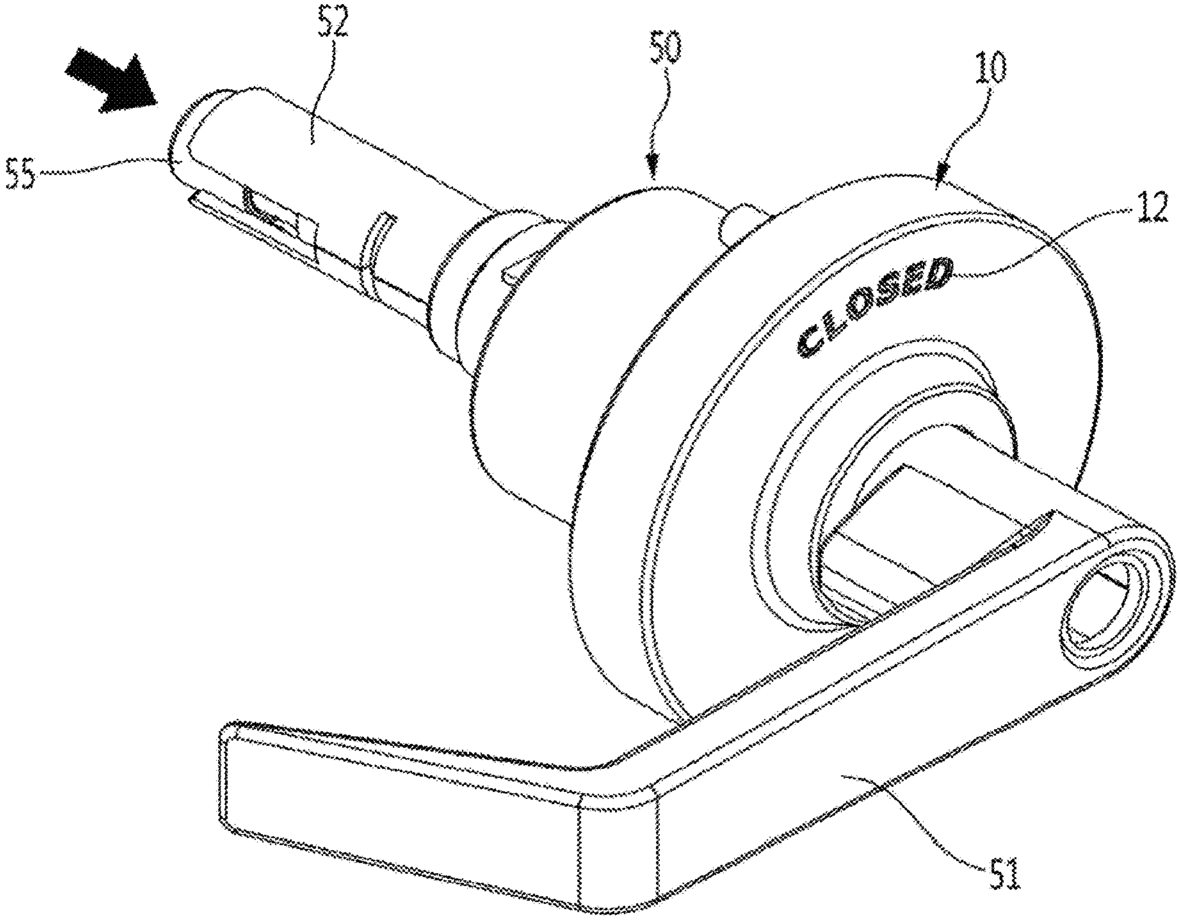
FIG. 1 is a perspective view of an indicator type door lock according to one illustrative embodiment.

Aspects described herein relate to door locks (e.g., cylindrical door locks) configured to indicate the lock status of the door lock, for example, to indicate whether the door lock is in an unlocked state or a locked state. The door lock may provide a visual indication of the lock status on a first side of the door (e.g., the interior of an entryway). The door lock with indicator may be configured such that the lock status is automatically indicated as the door lock is transitioned from the unlocked state to the locked state or from the locked state to the unlocked state. The door lock with indicator may be mechanical in that the door lock does not require electronic power and/or signal to indicate the lock status. The door lock with indicator may be configured for use with a door with standard door prep, although in some instances, the door lock with indicator may require the door to include additional modifications (e.g., the addition of one or more bore holes, slots, etc.).

The inventors have recognized and appreciated the general benefits of a door lock configured to automatically indicate the lock status of the door lock. For example, in some embodiments, a lock status is indicated on an interior side of the door. In such embodiments, the ability for persons in the interior of an entryway to quickly and easily determine the lock status may provide a feeling of comfort and security. Some door locks, (e.g., privacy locks and classroom locks), may be configured such that they are always unlocked from an interior of the entryway, while being selectively lockable from an exterior of the entryway. This configuration may provide for immediate internal egress while enabling external access control. Due to the fact that such locks are always unlocked from the interior side of the door, it may be difficult for persons on the interior side of the door to quickly ascertain the lock status of the door lock. The indication arrangement disclosed herein, when coupled to such locks, may enable persons on the interior side of the door to determine the lock status quickly and with a high degree of confidence, which may be desirable, for example, in emergency situations.

A door lock configured with the indication arrangement disclosed herein may include a locking mechanism with one or more actuators. The actuator(s) may be configured to reside in a first position when the door is in the unlocked state and a second position when the door is in a locked state. As the actuator transitions between the first position, corresponding to the unlocked state, and the second position, corresponding to the locked state, the actuator may directly apply a force to an indicator such that the indicator also transitions from a first position to a second position to indicate the state of the lock.

In some instances, the indicator may pivot from the first position to the second position. When the indicator is in the first position, it may be hidden such that it is not visible from an exterior of the door lock. For example, the indicator may be positioned such that it is not aligned with a window on the rose of the door lock. In such a position, a stationary background mounted behind the indicator may be visible through the window. When the indicator is in the second position, it may be visible from an exterior of the door lock through the window. In such a position, the stationary background may be blocked by the indicator such that it is hidden and not visible through the window. When the lock is transitioned back to the unlocked state from the locked state, the indicator may transition back to the first position.

Alternatively or additionally, the indicator may be capable of displaying two or more indications. For example, the indicator may include a first indication showing that the lock is in a locked state and a second indication showing the lock is in an unlocked state. Particularly, when the lock is in the locked state, the first indication may be visible through the window. Relatedly, when the lock is in the unlocked state, the second indication may be visible through the window.

According to some aspects, a cylindrical door lock with indicator includes a chassis and a locking mechanism coupled to the chassis. The locking mechanism may be configured to transition between an unlocked state and a locked state. In the unlocked state, a latch operatively coupled to the locking mechanism may be actuatable from an interior side and an exterior side of the door such that the door may be opened from the interior side and/or the exterior side of the door. In the locked state, the latch may not be actuatable from one side of the door (e.g., the exterior side the door) or from both sides of the door such that the door may not be opened from one and/or both sides. In some embodiments, the locking mechanism includes at least one actuator configured to act directly on an indicator such that the actuator can transition the indicator from a first state to a second state, when the locking mechanism transitions from an unlocked state to a locked state. For example, the actuator may be configured to transition the indicator from an unlocked indicating state to a locked indicating state when the locking mechanism transitions from an unlocked state to a locked state. In some instances, the actuator may also be configured to transition the indicator back from the second state to the first state, for example, from the locked indicating state back to the unlocked indicating state, when the locking mechanism transitions from the locked state back to the unlocked state. In some embodiments, a spring or other biasing member may be included, and the biasing member may be configured to bias the indicator towards the first state or the second state such that the indicator will transition to and reside in either the first state or the second state unless acted upon by the actuator. For example, in some embodiments, a spring may bias the indicator towards the first state, which may be the unlocked indicating state, such that the indicator transitions to and resides in the unlocked indicating state unless directly acted upon by the actuator of the locking mechanism.

In some embodiments, the cylindrical door lock with indicator includes a cover rose, also referred to as a rose, rosette, or escutcheon having at least one window. For example, the interior rose may comprise at least one window. The rose may be configured to cover the locking mechanism and the indicator such that they are inaccessible from an exterior of the door lock. Additionally, the window of the rose may be configured such that the indicator is either hidden or visible depending on the lock status of the door cylindrical door lock. For example, the indicator may be hidden when the door lock with indicator is in the unlocked state and may be visible when the door lock with indicator is in the locked state. In some embodiments, the indicator may be positioned such that it is not aligned with the window and therefore hidden when the door lock is in the unlocked state. In such embodiments, the indicator may be pivoted such that it is aligned with the window and therefore visible in the locked state.

Alternatively or additionally, as described herein, the indicator may be capable of displaying a first indication through the window in the rose when the door lock is in a first state (e.g., the locked state) and a second indication through the window in the rose when the door lock is in a second state (e.g., the unlocked state).

In some embodiments, the rose may be configured to cover a first indicator and a stationary background component, which may be configured as a second indicator. For example, the rose may cover a first, movable, locked indicator as described above and a second, stationary, unlocked indicator. The second indicator may be a stationary background component configured to be fixedly mounted to the chassis behind the first indicator. In such embodiments, the first indicator may be configured to be pivoted such that the first, movable indicator can selectively cover and block visibility of the second, stationary indicator through the one or more windows on the rose. For example, the window of the rose may be configured such that when the first indicator is hidden, the second indicator is visible and when the first indicator is visible, the second indicator is hidden. The first indicator and the second indicator may be visually distinct. For example, the first indicator may be a first color (e.g., red) and the second indicator may be a second color different from the first color (e.g., green). Alternatively or in addition, the first indicator and second indicators may each include different text (e.g., "LOCKED" and "UNLOCKED"), patterning, indicia, or any other suitably distinct visual arrangements.

In some embodiments, the chassis of a door lock with indicator may be configured to reside at least partially within the cylindrical aperture of a door. The cylindrical aperture may be configured as the standard cylindrical aperture for a cylindrical door lock (e.g., 161 prep configured with a 2⅛" hole extending through the door from a first face to a second face at a 2¾" backset), although alternatively configured cylindrical apertures may also be used. The chassis may be operatively coupled to a latch at a location interior to the cylindrical aperture and in line with the cross bore, which may be configured as a standard cross bore for a cylindrical door lock (e.g., 116 prep configured with an 1⅛"×2¼" hole on the door edge).

The chassis may be coupled to an interior handle on an interior side of the door and an exterior handle on the exterior side of the door. A locking mechanism may additionally be coupled to the chassis and may at least partially be housed by the interior or the exterior handle. The interior handle may comprise a lock button for transitioning the locking mechanism from an unlocked state to a locked state or from a locked state to an unlocked state. In some embodiments, the lock button is configured such that it must be pressed inwards towards the door and rotated in a first direction about the longitudinal axis of the lock button (e.g., counterclockwise) to transition the locking mechanism from the unlocked state to the locked state. In such embodiments, the lock button is rotated in a second direction opposite to the first direction about a longitudinal axis of the lock button (e.g., clockwise) and extended outwards to transition the locking mechanism from the locked state back to the unlocked state. In some embodiments, the exterior door handle comprises a keyway for transitioning the lock between an unlocked state and a locked state. In such embodiments, rotating the keyway with the appropriate key in a first direction (e.g., counterclockwise) transitions the locking mechanism from a locked state to an unlocked state and rotating the keyway in a second direction (e.g., clockwise) transitions the locking mechanism from a locked state back to the unlocked state. When the locking mechanism is in the unlocked state, both the interior handle and the exterior handle may be used to actuate the latch such that the door can be opened. When the locking mechanism is in the locked state, one or both interior and the exterior handles is prevented from actuating the latch such that the door is prevented from being opened from one or both interior and/or the exterior handles. As will be appreciated by one of skill in the art, the lock may be transitioned between states in any suitable manner, depending on the application.

As discussed herein, in some embodiments, the locking mechanism includes an actuator configured to act directly on an indicator (e.g., by moving the indicator). In some instances, the actuator is configured as a tooth that extends radially outwards from the outer surface of the latching mechanism, although it should be appreciated that any suitable feature (e.g., boss, fin, post, cavity, channel, etc.) may be used as the disclosure is not limited in this respect. The actuator is configured to rotate with the locking mechanism as at least a portion of the locking mechanism rotates in a first direction (e.g., counterclockwise) as the locking mechanism transitions between the unlocked state and the locked state. Likewise, the actuator is configured to rotate with the locking mechanism in a second direction (e.g., clockwise) as the locking mechanism transitions between the locked state and the unlocked state. For example, in embodiments wherein the interior door handle comprises a lock button that is pressed inwards and rotated in a first direction about a longitudinal axis of the lock button to transition the locking mechanism from an unlocked state to a locked state (e.g., as described herein), the actuator configured to act directly on the indicator also rotates a corresponding distance in the first direction. Likewise, when the lock button is rotated in a second direction about a longitudinal axis of the lock button and extended outwards from the door to transition the locking mechanism from a locked state to an unlocked state, the actuator configured to act directly on the indicator also rotates a corresponding distance in the second direction. As such, the actuator in direct contract with the indicator is configured such that it is in a first position when the locking mechanism is in an unlocked state, and second position different from the first position when the locking mechanism is in a locked state.

An indicator may be pivotably mounted to the chassis of a door lock, and may, for example, be pivotably mounted to the chassis behind the interior rose of the door lock. Such an indicator may be configured to directly be acted on by an actuator of the locking mechanism. As used herein, directly acted upon may be interpreted to mean that the actuator directly applies an operative force to the indicator without the use of one or more intermediary components, such as a transmission. In some embodiments, the indicator comprises an interfacing surface configured to be acted upon by the actuator of the locking mechanism. Such a surface may provide a platform configured and arranged to be contacted by the actuator of the locking mechanism.

When the actuator of the locking mechanism configured to act directly on the indicator is in the first position, for example, the unlocked position, the indicator may be in a first position, for example, an unlocked indicating position. When the locking mechanism is rotated in a first direction, for example, to transition the locking mechanism from an unlocked state to a locked state, the corresponding rotation of the actuator applies a force to the interfacing surface of the indicator such that the indicator pivots in a first direction. At a certain point (e.g., when the locking mechanism is rotated a predetermined angle of rotation or angular distance), the locking mechanism reaches the locked state, and the indicating mechanism simultaneously reaches a second position, for example, a locked indicating position. The actuator of the locking mechanism may hold the indicator in this position until the locking mechanism is transitioned back to the unlocked state. In some instances, the locking mechanism may hold the indicator in the second position against the force of a biasing member, for example, a torsion spring arranged to bias the indicator in the first position. When the locking mechanism is transitioned back into the unlocked state from the locked state, the actuator may apply an opposite force to the interfacing surface of the indicator such that the indicator pivots in a second direction. In alternate embodiments, such as those comprising a biasing member, the biasing member may pivot the indicator in a second direction back to the first position as the actuator rotates in a second direction. In either case, when the locking mechanism reaches the unlocked state, the indicating mechanism may simultaneously reach the first position.

In some instances, the locking mechanism may be transitioned from the locked to the unlocked state and from the locked to the unlocked state from either the interior or the exterior of the door. For example, the locking mechanism may be transitioned to and/or from the locked to the unlocked state via a lock button on the interior handle, or via a keyway on the exterior handle. In either case, the locking actuator is configured to transition to the desired state, rotating the actuator in the corresponding direction, driving the indicator to the appropriate indicating position.

As described herein, the indicator may be covered by a rose of the door lock such that the indicator is not accessible from an exterior of the door lock. This may prevent the indicator from being tampered with and/or damaged. Alternatively or additionally, this may be done for aesthetic purposes. The rose may be configured to include one or more windows. The one or more windows may comprise a transparent and/or translucent material. For example, the window (s) may comprise a transparent or translucent plastic (e.g., ABS, acrylic, or nylon) or glass. The window(s) may be formed into suitable shape. The window(s) may be configured such that an internal cavity and any components therein are visible through the window(s) of the rose. For example, a person standing in proximity to the door lock on the interior of the door may be able to see one or more components internal to the interior rose through the one or more windows. In some embodiments, the indicator may be selectively visible through the window. For example, the indicator may not be visible through the window(s) when the door lock and locking mechanism are in the unlocked state, and the indicator may be visible through the window(s) when the door lock and locking mechanism are in the locked state. As such, the door lock may be configured to visually indicate the lock status of the door lock via the indicator through the one or more windows.

In some embodiments, the door lock may be configured to include a second indicator. The second indicator may be configured and arranged to fit behind the first indicator described above, such that the second indicator is selectively visible through the one or more windows of the rose. For example, the second indicator may be configured to be mounted to fixedly mounted to the chassis of the door lock such that it is stationary relative to the chassis. The first indicator may be pivotably mounted between the second indicator and the rose such that the first indicator can be pivoted into and out of alignment with the window(s) of the rose. In this way, the second indicator may be configured such that it is visible when the first indicator is hidden. Relatedly, the second indicator may be configured such that the second indicator is hidden when the first indicator is visible. For example, when the door lock is in the unlocked state, the first indicator may be hidden, and the second indicator may be visible.

In some embodiments, when the door lock is in the locked state, the first indicator may be visible, and the second indicator may be visible. In instances wherein the first indicator is pivotably mounted as described above, the second indicator may be fixedly coupled to the door lock such that it does not move relative to the locking mechanism. In such embodiments, the first indicator may pivot from a first position, wherein the first indicator is hidden, to a second position between the window(s) and the second indicator such that the first indicator covers and hides the second indicator. In alternate embodiments, the second indicator may additionally be pivotable or otherwise movable and may be driven by the same actuator of the locking mechanism as the first indicator. In other embodiments, the second indicator may be pivotable or otherwise movable, and may be configured to be driven by a different component than the first indicator (e.g., a second actuator of the locking mechanism, an intermediary component, etc.).

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Referring to FIGS. 1 to 4, a first handle shaft 52 and a second handle shaft 53 are mounted on both sides of a driving body 50. A push button 55 for setting a lock state of the door lock is mounted at one end of the first handle shaft 52. A door lock main body 20 is mounted in front of the driving body 50. An indicator member 30 including a first display member 30*a* and a second display member 30*b* is mounted in front of the door lock main body 20. In addition, a main body cover 10 is mounted on the door lock main body 20, and a display portion 12 is formed on the main body cover 10.

The indicator member 30 is constructed such that the first display member 30*a* and the second display member 30*b* are linked to be pivoted in opposite directions to each other.

Here, the first display member 30*a* is constructed in a flat member having an approximately half arc shape, and the second display member 30*b* is also constructed in a corresponding shape to (or the same shape as) the first display member 30*a*.

Figure 3:
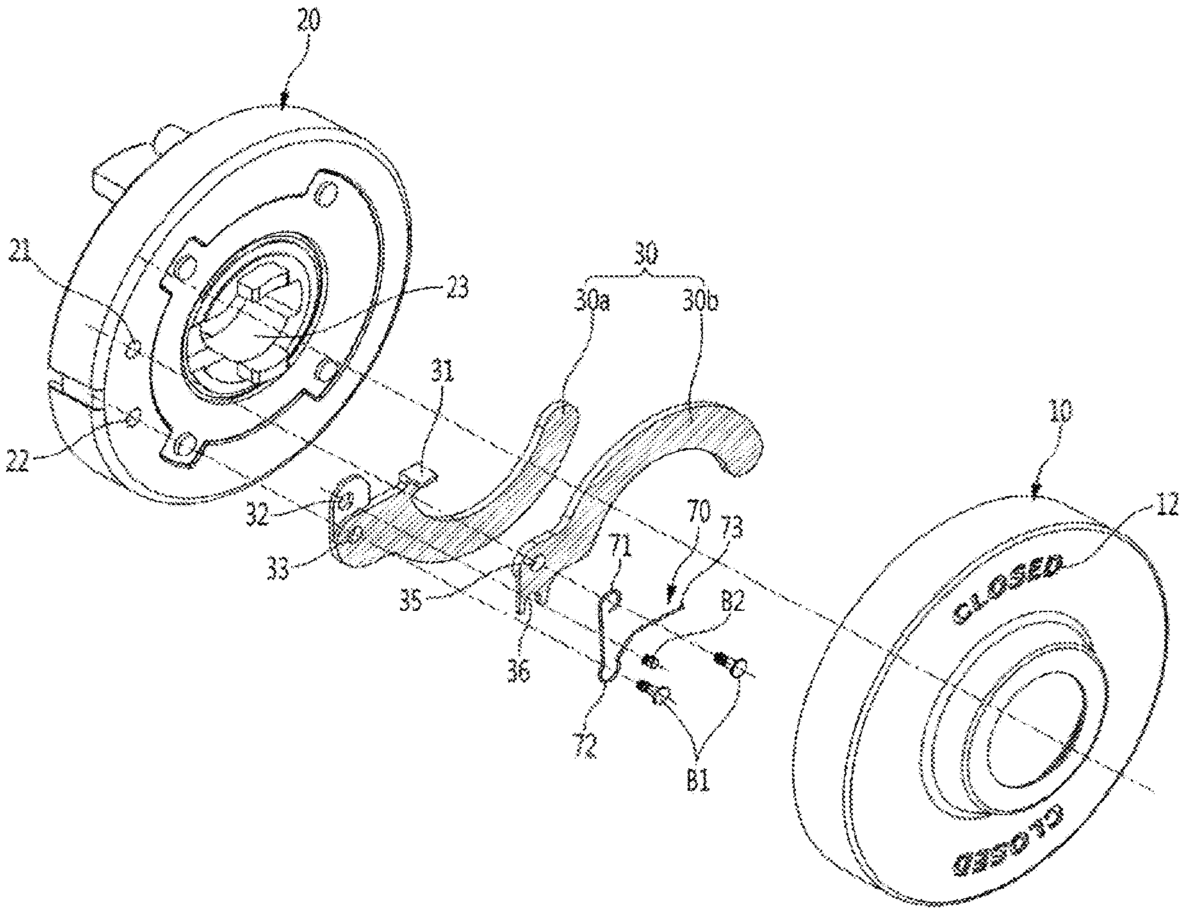
FIG. 3 is an exploded perspective view of a portion of the indicator type door lock according to the embodiment of FIG. 1.

A display portion 12 is formed on the front surface of the main body cover 10 to indicate a locked state of the door lock. Here, the display portion 12 is formed at the upper portion and/or the lower portion of the front surface of the main body cover 10 as shown in FIG. 3. The display portion 12 is formed by engraving letters for example, 'CLOSED' on the front surface of the main body cover 10 and hollowing them out.

In addition, a first mounting hole 21 and a second mounting hole 22 are formed in front of the door lock main body 20, and a first connection hole 35 of a second display member 30*b* is bolted to the first mounting hole 21 through a bolt B1, so that the second display member 30*b* is pivotably installed on the door lock main body 20. A second connection hole 33 of the first display member 30*a* and the second mounting hole 22 are connected to each other through the bolt B1, so that the first display member 30*a* is also pivotably installed on the door lock main body 20.

On the other hand, a connection end 31 is formed on the first display member 30*a*, and a support end 73 of a pin spring 70 is seated on the connection end 31. Here, the pin spring 70 may be constructed to have a shape as shown in FIG. 3 by bending a pin of a metallic material having elasticity and may be fixed to be mounted on the indicator member 30. Specifically, the pin spring 70 is formed by bending in an approximately circular shape a first connection area 71 and a second connection area 72 through which the bolt B1 passes. In addition, a support end 73 is formed to be bent from the second connection area 72 of the pin spring 70. Here, the support end 73 is seated on the connection end 31 of the first display member 30*a* of the indicator member 30. Therefore, the support end 73 of the pin spring 70 and the connection end 31 of the first display member 30*a* are elastically supported with each other.

On the other hand, the first connection hole 32 of the first display member 30*a* and the second connection hole 36 of the second display member 30*b* are connected to each other through the bolt B2, and the first display member 30*a* and the second display member 30*b* are linked to be pivoted in opposite directions to each other.

For example, when the first display member 30*a* is pivoted in the clockwise direction about second connection hole 33, the second display member 30*b* is pivoted in counterclockwise direction about the first connection hole 35.

Figure 4:
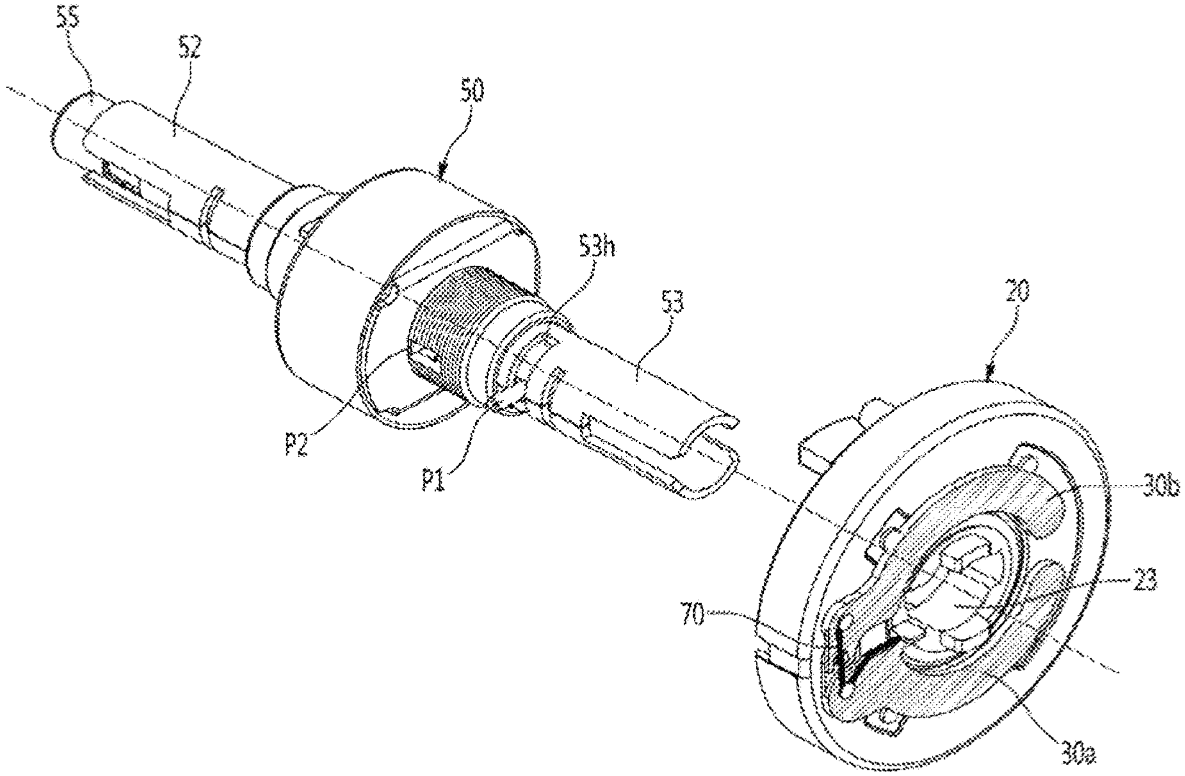
FIG. 4 is an exploded perspective view of a driving body and a door lock main body of the indicator type door lock according to the embodiment of FIG. 1.
Figure 5A:
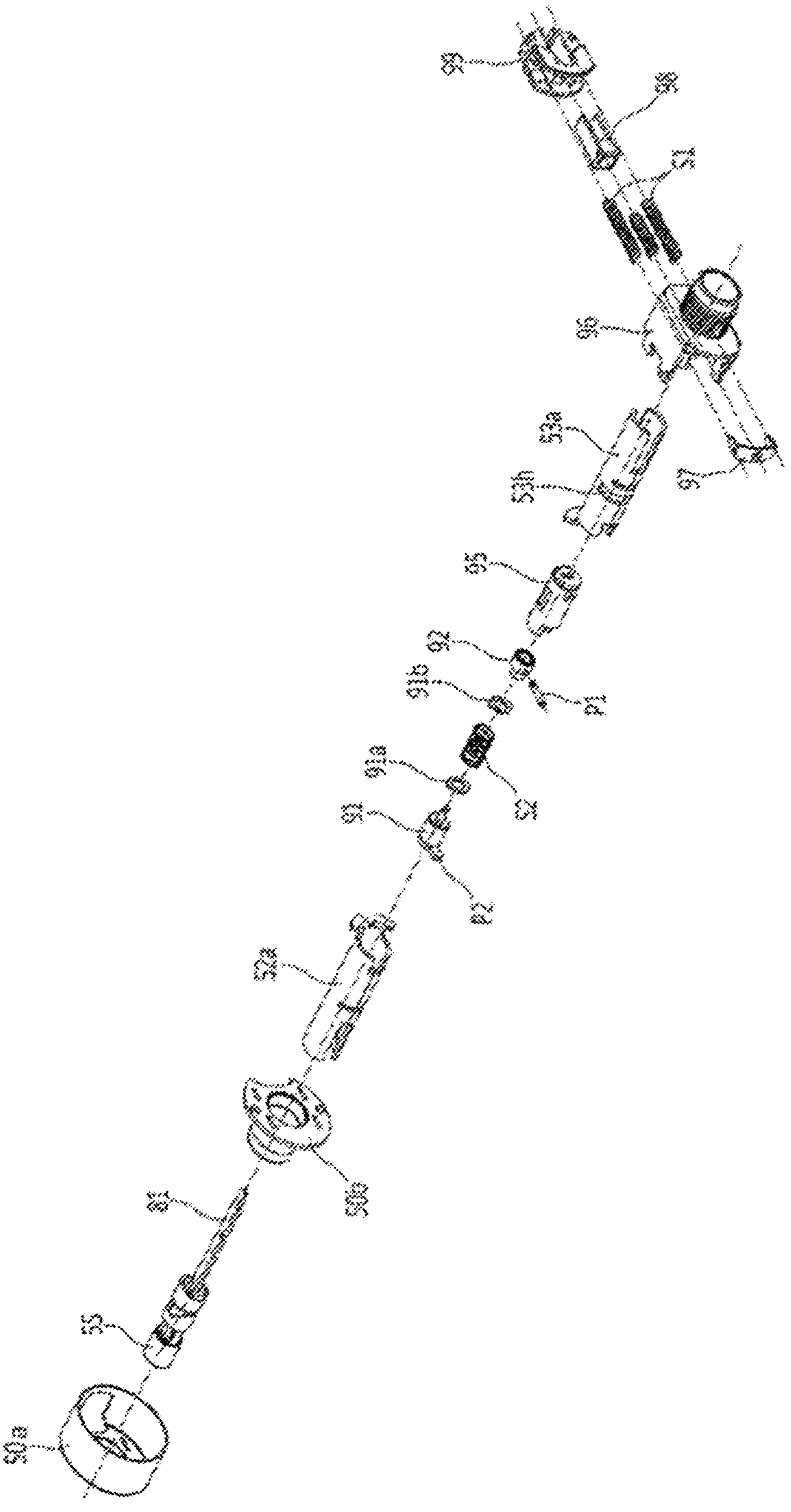
FIG. 5A is an exploded view of the driving body of the indicator type door lock according to the embodiment of FIG. 1.
Figure 5B:
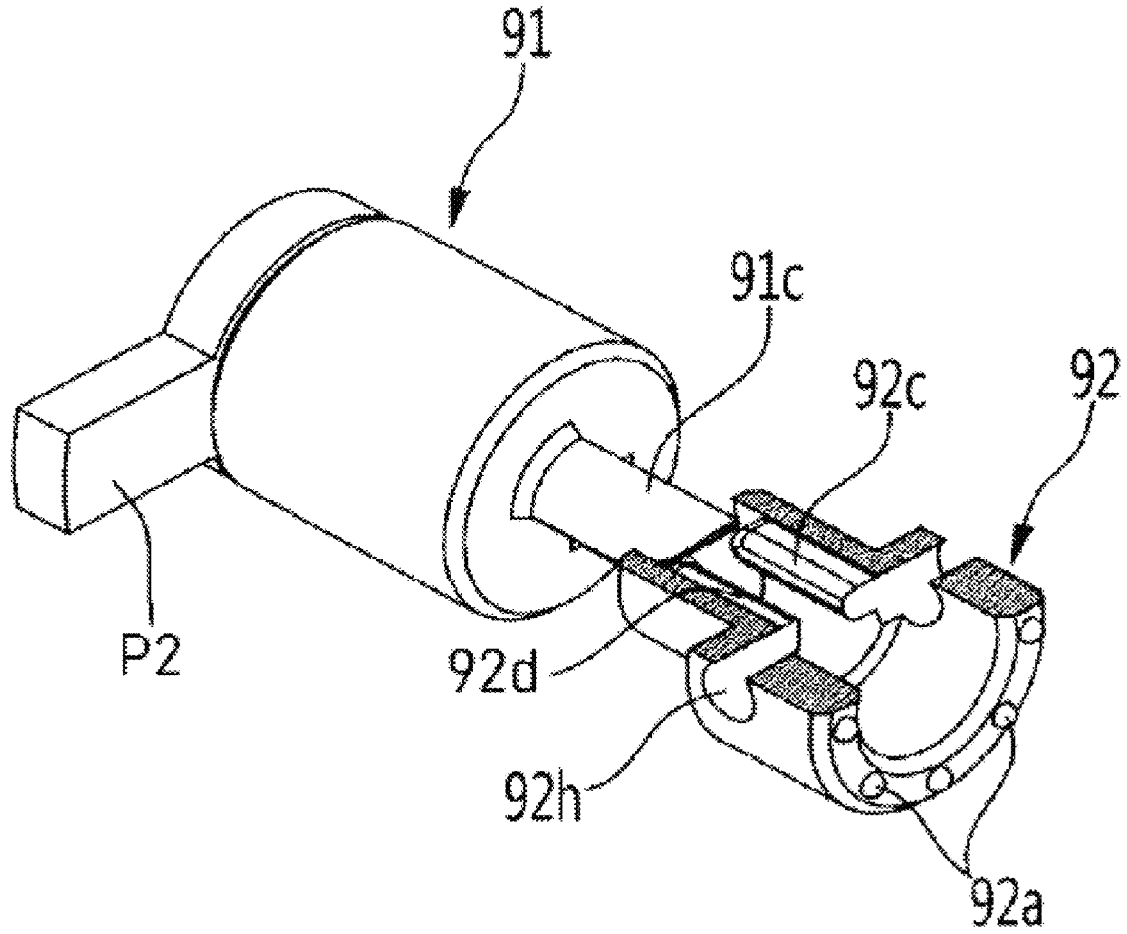
FIGS. 5B-5C are drawings showing a connection state of a cam portion and a pin rotator of the indicator type door lock according to the embodiment of FIG. 1.
Figure 5C:
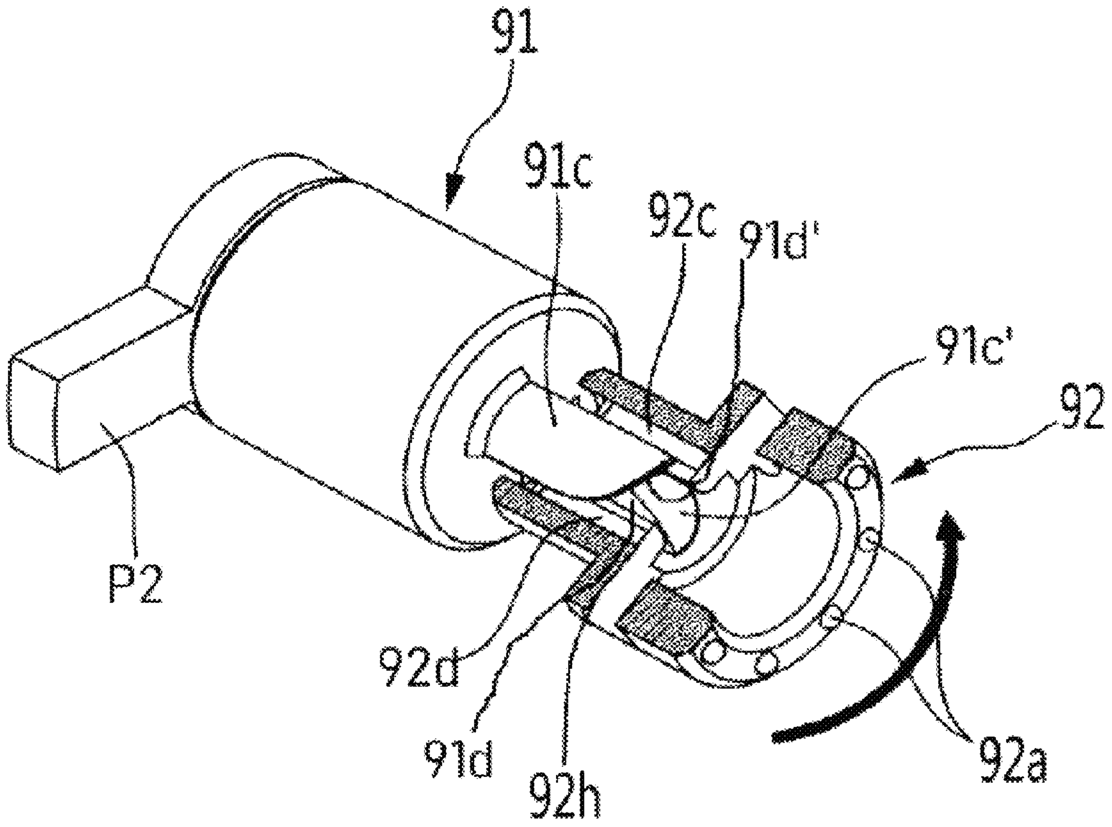
Figure 6:
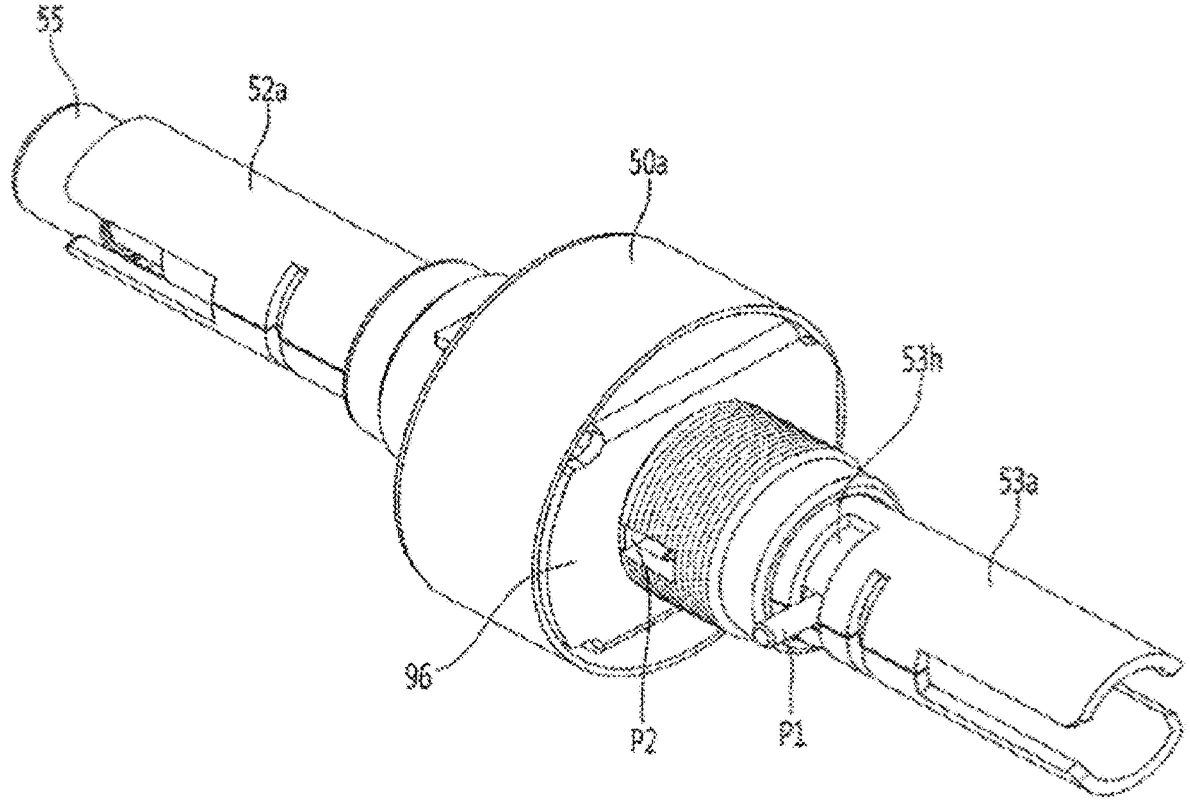
FIG. 6 is a perspective view of the driving body of the indicator type door lock according to the embodiment of FIG. 1.

Referring to FIGS. 4 to 6, a first handle shaft 52 and a second handle shaft 53 are connected to the driving main body 50, respectively. And referring to FIG. 5A, when a push button 55 is pressed, a push end 81 of the push button 55 in a first tube 52*a* moves a cam portion 91 in the axial direction inside the first tube 52*a*. At this time, a guide pin P2 is formed on the outer circumferential surface of the cam portion 91, and as shown in FIG. 4, the guide pin P2 is guided in the lengthwise direction of the second handle shaft 53 along a guide hole, thereby guiding the linear movement of the cam portion 91.

Referring to FIG. 5B and FIG. 5C, a pair of cam posts 91*c* and 91*d* extend and protrude in a predetermined length in front of the cam portion 91. The cam surfaces 91*c*' and 91*d*' are formed inside these cam posts 91*c* and 91*d*, respectively.

Also, a pin rotator 92 is inserted into the front portion of the cam posts 91*c*, 91*d*. At this time, the pin rotator 92 has a pair of guide ribs 92*c* and 92*d* formed parallel to its longitudinal direction at the inner side thereof, and the guide ribs 92*c* and 92*d* slide in contact with the cam surfaces 91*c*' and 91*d*' of the cam posts 91*c* and 91*d*. Also, a pin coupling hole 92*h* penetrating in the vertical direction of the guide ribs 92*c* and 92*d* is formed on the pin rotator 92. And a driving pin P1 is installed in the pin coupling hole 92*h*.

Moreover, as shown in FIG. 5A, a spring S2 is installed between the cam portion 91 and the pin rotator 92.

When the push button 55 is pressed by this spring S2, the cam portion 91 is moved forward, and, at this time, the guide ribs 92*c* and 92*d* of the pin rotator 92 contact with the cam surfaces 91*c*' and 91*d*' of the cam posts 91*c* and 91*d*. When the cam portion 91 is gradually advanced in this state, the pair of guide ribs 92*c* and 92*d* of the pin rotator 92 are guided along the cam surfaces 91*c*' and 91*d*'. Consequently, as shown in FIG. 5C, the pin rotator 92 rotates counterclockwise.

On the contrary, when the pressing force on the push button 55 is released, the cam portion 91 is returned to its original state by the elastic force of the spring S2. That is, the cam portion 91 moves from the state of FIG. 5C to the state of FIG. 5B.

Figure 2:
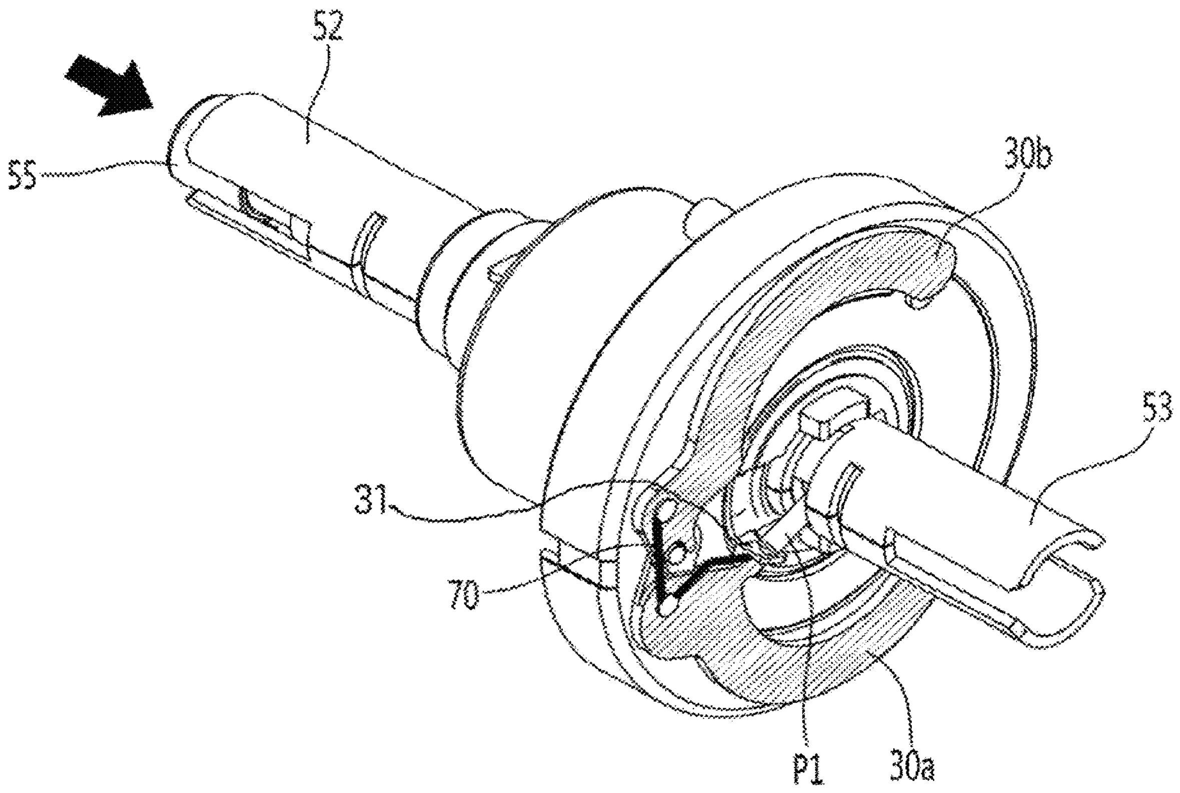
FIG. 2 is a perspective view showing an indicator member of the indicator type door lock according to the embodiment of FIG. 1.

As such, when the cam portion 91 is moved forward by pressing the push button 55, the pin rotator 92 to which a driving pin P1 is connected as shown in FIG. 2 is rotated counterclockwise, so that the driving pin P1 pushes out the connection end 31 to pivot the first display member 30*a*. At this time, the second display member 30*b* also is pivoted to a certain radius in conjunction with the first display member 30*a*. Consequently, the first display member 30*a* and the second display member 30*b* of the indicator member 30 transition to an open state relative to each other.

Meanwhile, in FIG. 5A, a guide hole 53*h* is formed in a second tube 53*a* so that the driving pin P1 of the pin rotator 92 moves by a certain radius, and the second tube 53*a* is connected to the front of a fixed member 50*b*. A key cylinder 95 is installed inside this second tube 53*a*. In addition, a handle locking body 96 is connected to the front of the second tube 53*a* and a handle portion 51 is provided in front of the handle locking body 96. At this time, the handle locking body 96 serves to lock the rotation of the handle portion 51 at the outside when the push button 55 is pressed. Also, a fixing block 99 having a cover part 97, a pushing post 98 and a spring S1 may be provided to release the handle lock state by using the fixing block 99. As will be appreciated by one of skill in the art, the illustrated embodiment depicts a conventional lever-type door lock, though other suitable lock types may be employed, depending on the application.

In addition, a spring S2 is fitted between the cam portion 91 and the pin rotator 92 and inserted into a first tube 52*a*. Accordingly, the pin rotator 92 may be returned to its original state from a state in which the push button 55 is pressed by the elastic force of the spring S2.

According to the indicator type door lock of the present disclosure constructed as described above, when the push button 55 is pressed in the room, the cam portion 91 is moved to rotate the pin rotator 92. At this time, the driving pin P1 of the pin rotator 92 moves along the guide hole 53*h* of the second tube 53*a*. And when the driving pin P1 pushes out the connection end 31 of the first display member 30*a*, the first display member 30*a* is pivoted clockwise from the position shown in FIG. 2. At this time, the second display member 30*b* also is pivoted to a certain radius in conjunction with the first display member 30*a*.

Accordingly, the first display member 30*a* and the second display member 30*b* may be in an open state relative to each other and are placed at the corresponding position to the display portion 12. In this case, the first display member 30*a* and the second display member 30*b* may be colored with a predetermined color (for example, red). In a state in which the first display member 30*a* and the second display member 30*b* are opened relative to each other and placed at the corresponding position to the display portion 12 as described herein, they are exposed to the outside through the display portion 12. Therefore, when the display portion 12 may be seen with the naked eye from the outside, the red colored 'CLOSED' may be identified for the user to recognize that the door lock is now locked.

On the contrary, when the push button 55 returns to its original state by operating the handle 51 in the room (e.g., the release operation by the handle locking body 96), the driving pin P1 is returned to its original state, and the external force (e.g., the supporting force) to press the first display member 30*a* no longer exists. Accordingly, the first display member 30*a* and the second display member 30*b* are returned to their original state (e.g., a closed state) by the elastic force of the pin spring 70 and deviate from the corresponding position to the display portion 12. Therefore, the red color disappears from the letters 'CLOSED' of the display portion 12 of the main body cover 10. In this way, it is possible for the outside user to recognize the unlocked state of the door lock.

Figure 7:
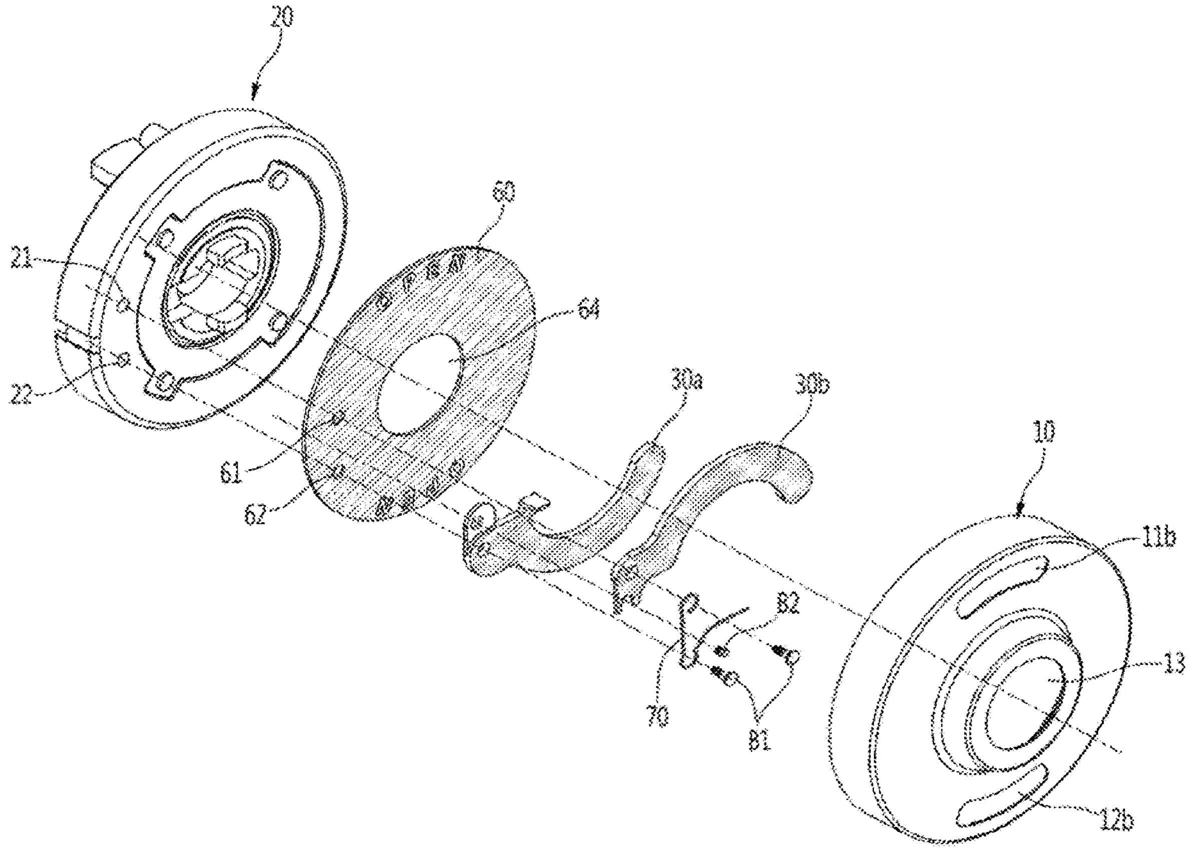
FIG. 7 is an exploded view of the indicator type door lock according to one illustrative embodiment.

Referring to FIG. 7, a door lock according to the present disclosure may further include a display plate 60 in front of the door lock main body 20 in addition to the indicator member 30 having the first display member 30*a* and the second display member 30*b*.

Specifically, the display plate 60 is provided as a green circular plate, and a first through hole 61 and a second through hole 62 are formed on the side of the display plate 60. In addition, letters marked with 'OPEN' are displayed on the upper and lower portions of the display plate 60, respectively. Also, letters 'CLOSED' are displayed on the first display member 30*a* and the second display member 30*b*, respectively.

Meanwhile, display openings 11*b* and 12*b* are formed in a predetermined area in front of the main body cover 10. The first display member 30*a* and the second display member 30*b* are pivoted to a certain radius respectively by the driving pin P1 (e.g., as shown on FIG. 4) of the driving body 50 to be in an open state to each other.

Figure 8A:
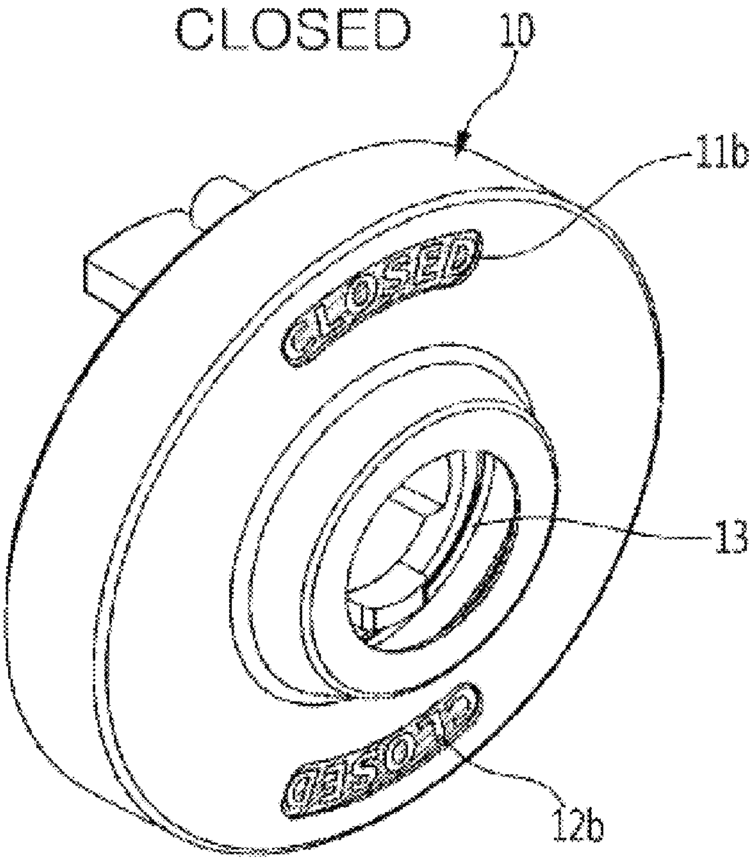
FIGS. 8A-8B are drawings showing the use of the indicator type door lock according to the embodiment of FIG. 7.
Figure 8B:
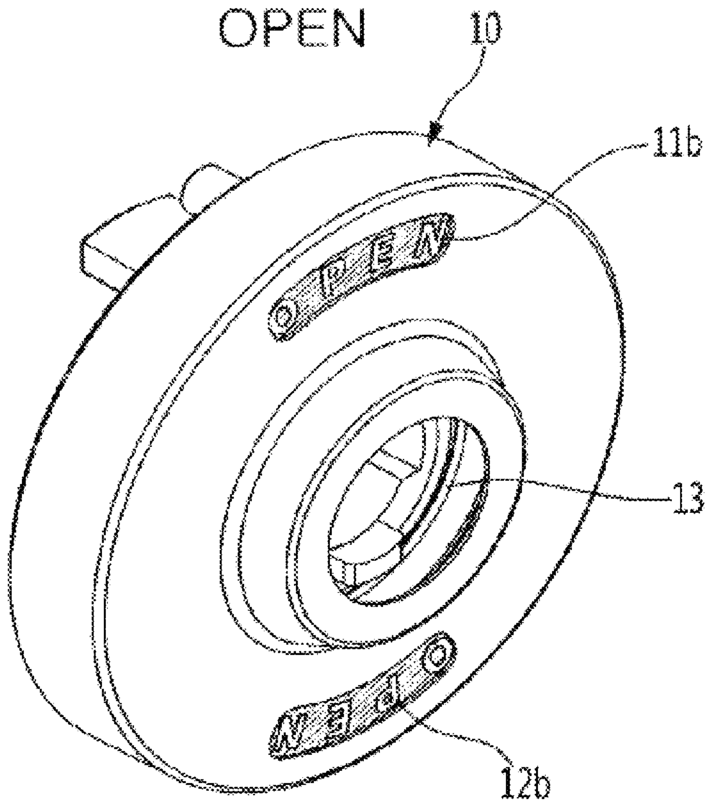

Accordingly, in a state in which the first display member 30*a* and the second display member 30*b* are not opened, a portion of the display plate 60 is exposed to the outside through the display openings 11*b* and 12*b* as shown in FIGS. 5A and 5B, such that the user may easily recognize the indication with the naked eye. That is, the letters 'OPEN' of the display plate 60 are exposed through the display openings 11*b* and 12*b* (e.g., as shown in FIG. 8B).

On the other hand, when the locking state of the door lock is set by pressing the push button 55 of the driving body 50, the driving pin P1 of the driving member 50 is pivoted, and the first display member 30*a* and the second display member 30*b* are opened to each other (e.g., as shown in FIG. 2). In this case, these members 30*a* and 30*b* cover the letters 'OPEN' of the display plate 60 respectively and the letters 'CLOSED' on the first display member 30*a* and the second display member 30*b* are exposed to the outside through the display openings 11*b* and 12*b* (e.g., as shown in FIG. 8A).

Figure 9A:
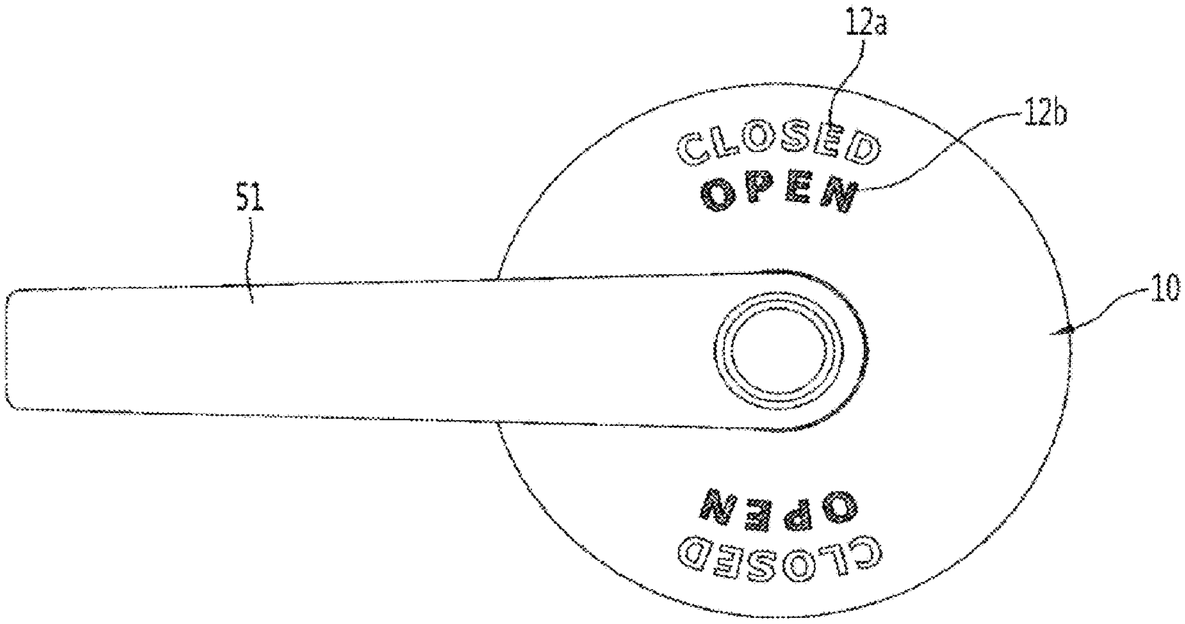
FIGS. 9A-9B are drawings showing the use of the indicator type door lock according to one illustrative embodiment.
Figure 9B:
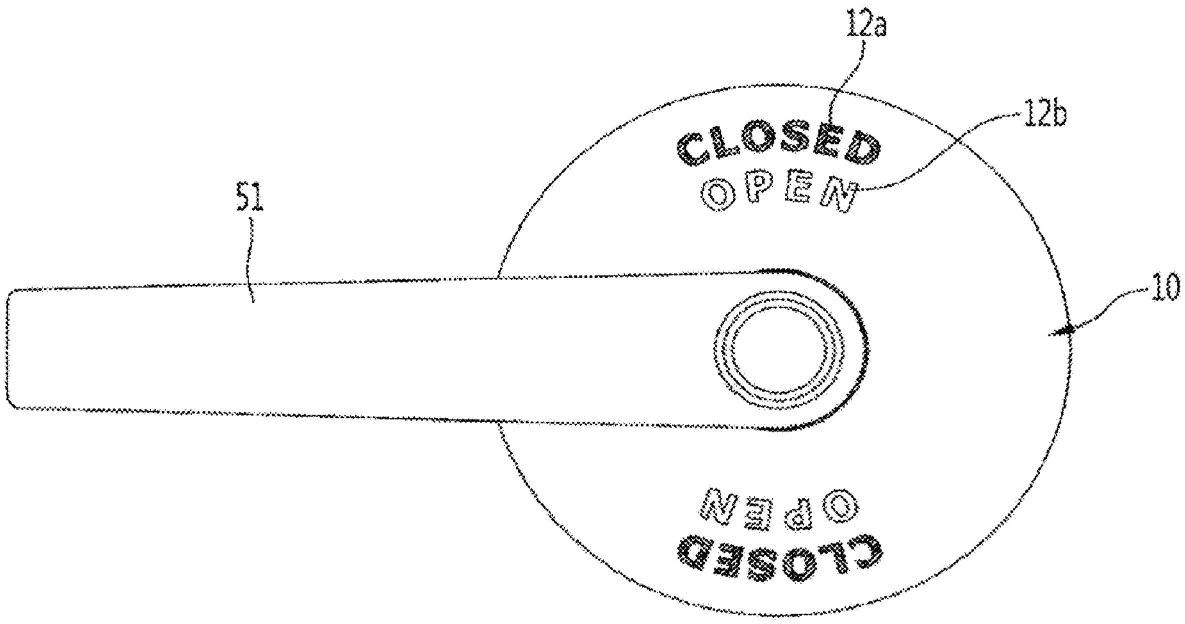

Referring to FIGS. 9A and 9B, the main body cover 10 of the present disclosure may further include an auxiliary display portion 12*b* marked with 'OPEN' in addition to a display portion 12*a* marked with 'CLOSED'. The auxiliary display portion 12*b* is formed by engraving letters 'OPEN' on the front surface of the main body cover 10 and hollowing them out.

In this case, when the first display member 30*a* and the second display member 30*b* are pivoted to be opened to each other, they are placed at the corresponding position to the display portion 12*a* marked with 'CLOSED' on the main body cover 10 (e.g., as shown in FIG. 9B). However, in the usual state (e.g., the unlocked state), they are placed at the corresponding position relative to the auxiliary display portion 12*b* marked with 'OPEN' (e.g., as shown in FIG. 9A). Therefore, in this way, the user may more clearly recognize the locking and/or unlocking state of the door lock, even with the naked eye from the outside.

Referring to FIGS. 10A-11B, according to the present embodiment, a first indication M1 marked with 'OPEN' is provided on the upper portion of the display plate 60, and a second indication M2 marked with 'CLOSED' is provided on the front surface of the first display member 30*a*. In addition, a display opening 11*a*' is formed on the upper portion of the body cover 10.

Figure 10A:
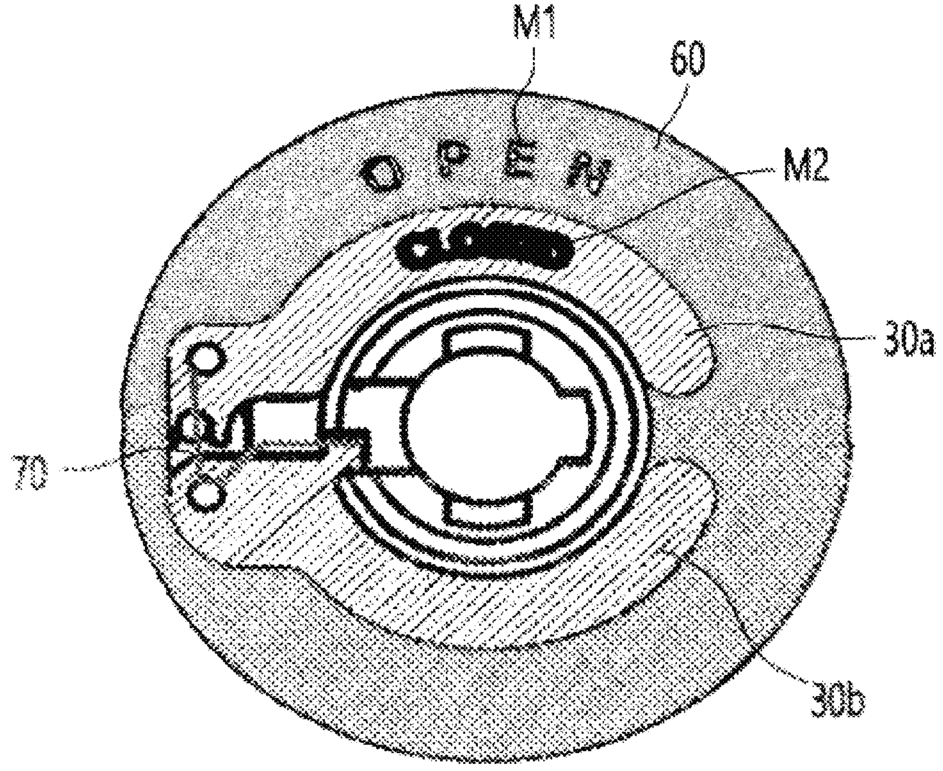
FIGS. 10A-11B are drawings showing the use of the indicator-type door lock according one illustrative embodiment.
Figure 10B:
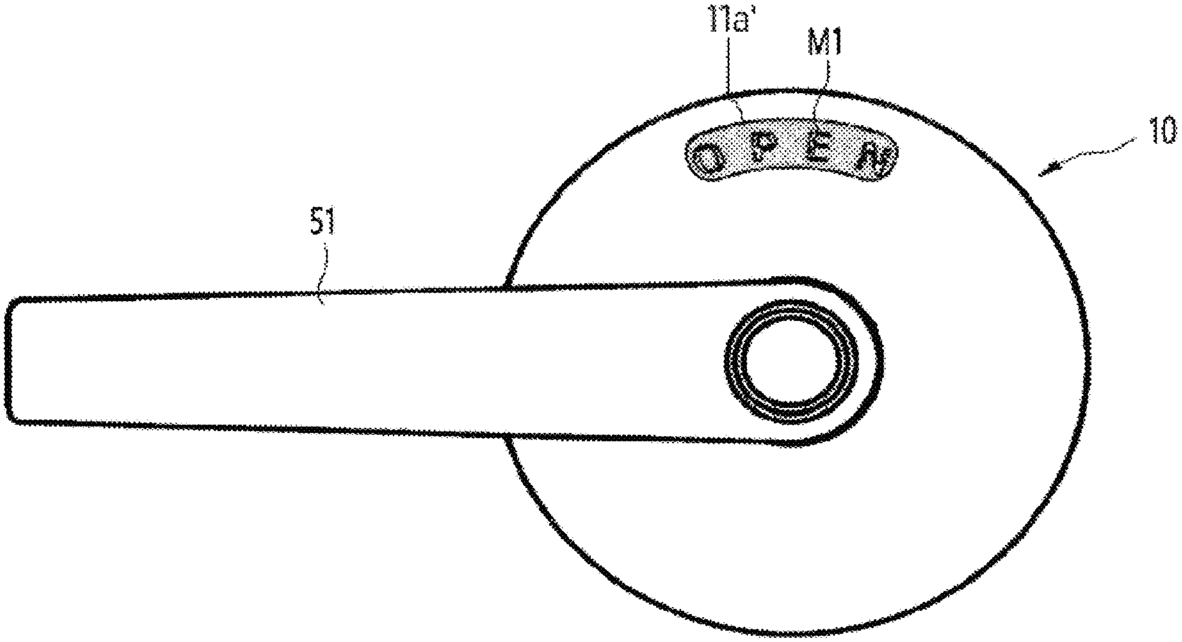
Figure 11A:
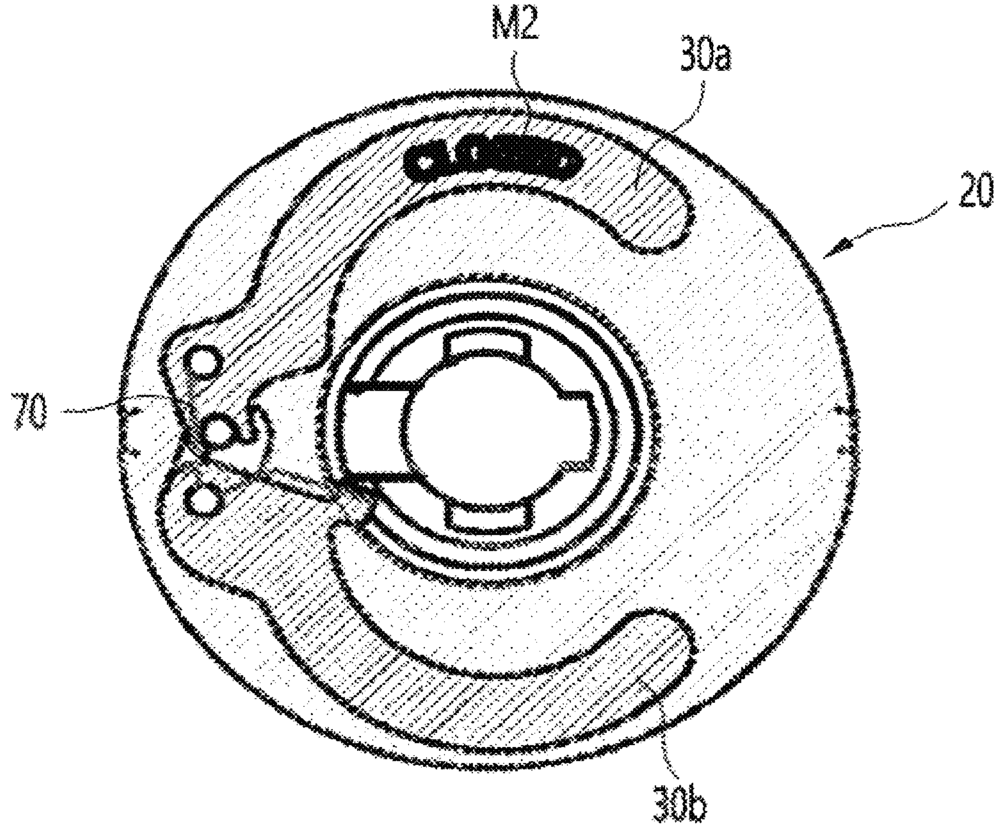
Figure 11B:
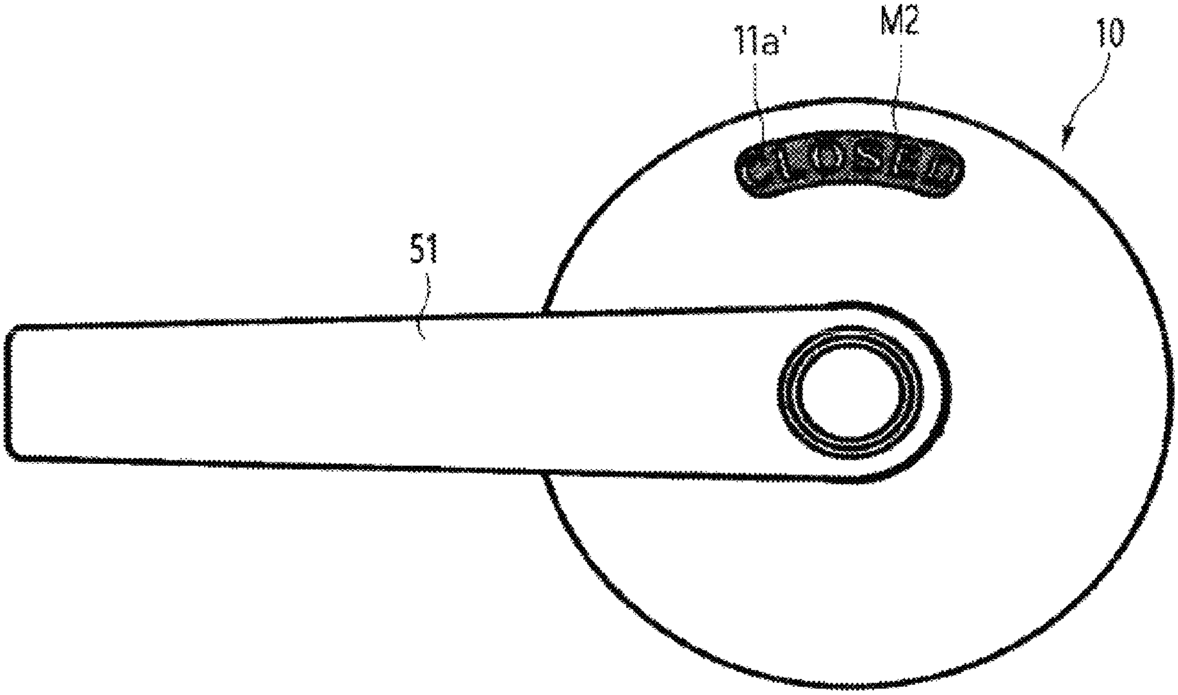

With this configuration, when the first display member 30*a* and the second display member 30*b* are opened to each other as shown in FIG. 11A, the second indication M2 is exposed through the display opening 11*a*' as shown in FIG. 11B. Conversely, when the first display member 30*a* and the second display member 30*b* are closed to each other, for example as shown in FIG. 10A, the first indication M1 is exposed through the display opening 11*a*' as shown in FIG. 10B.

Referring to FIGS. 12A-13B, a second display member 30*b*' is provided with an indicator region 35*s* and a display opening 13*a* is provided on the front surface of the body cover 10. At this time, the indicator region 35*s* is provided in the form of extending by a predetermined area from an end of the second display member 30*b*'.

Figure 12A:
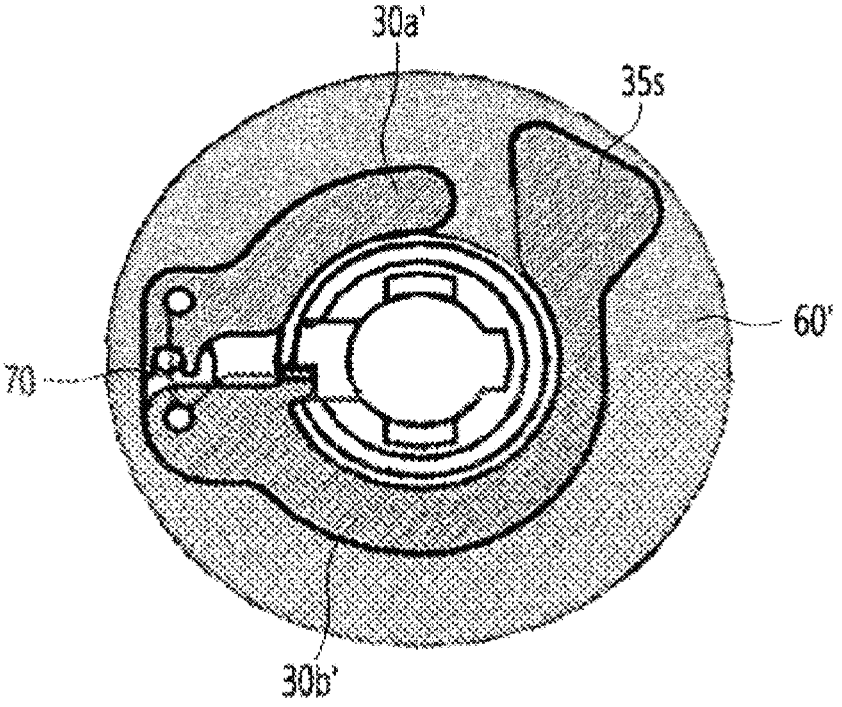
FIGS. 12A-13B are drawings showing the use of the indicator-type door lock according to another illustrative embodiment.
Figure 12B:
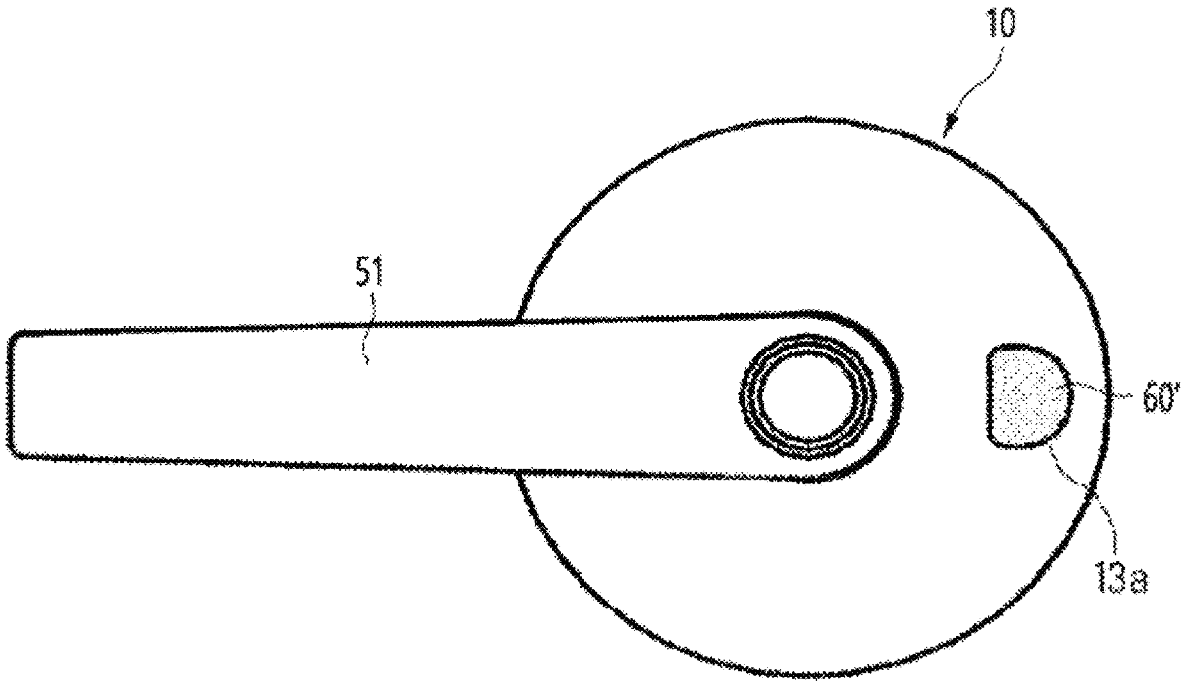
Figure 13A:
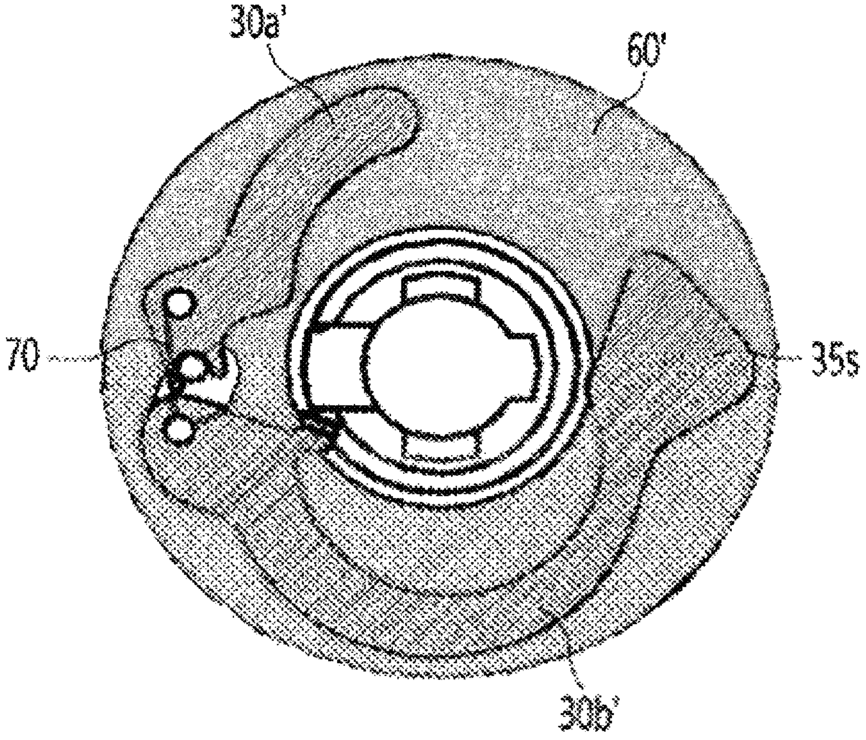
Figure 13B:
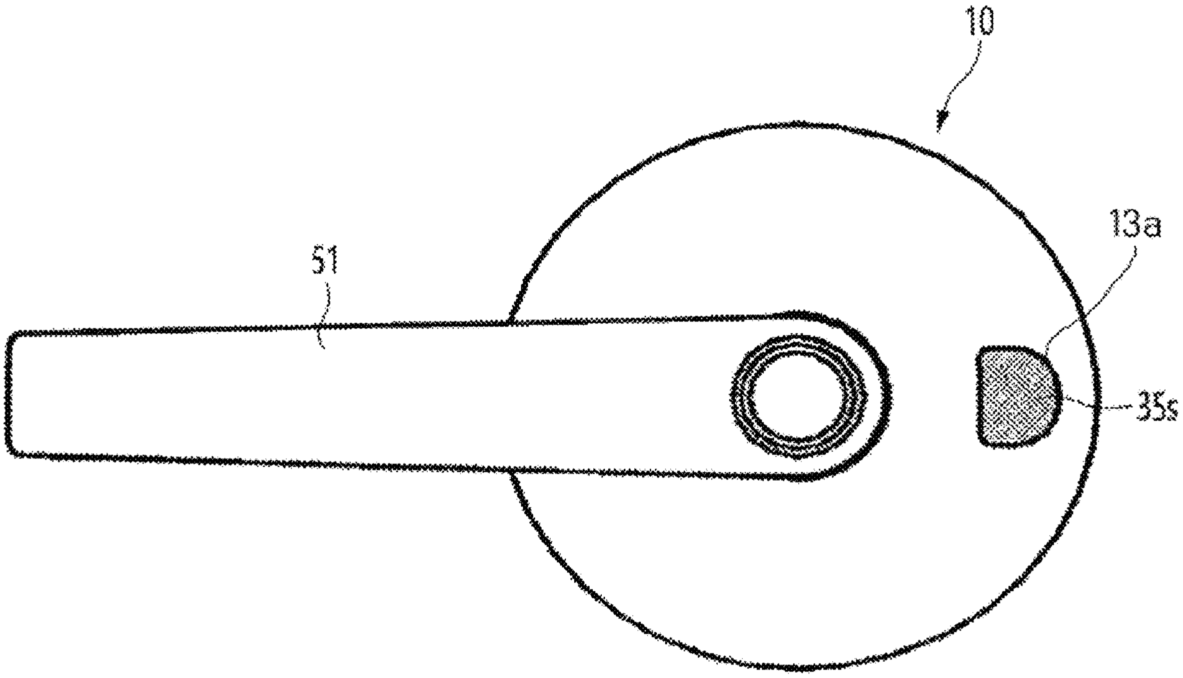

In such a configuration, when a first display member 30*a*' and the second display member 30*b*' are opened relative to each other, for example as shown in FIG. 13A, the indicator region 13*a* is exposed through the display opening 13*a* as shown in FIG. 13B. On the contrary, when the first display member 30*a*' and the second display member 30*b*' are closed to each other as shown in FIG. 12A, a portion of a display plate 60' is exposed through the display opening 13*a*, for example as shown in FIG. 12B.

Accordingly, the user may easily recognize whether the door lock is locked or unlocked indoors with the naked eye from the outside.

Figure 14:
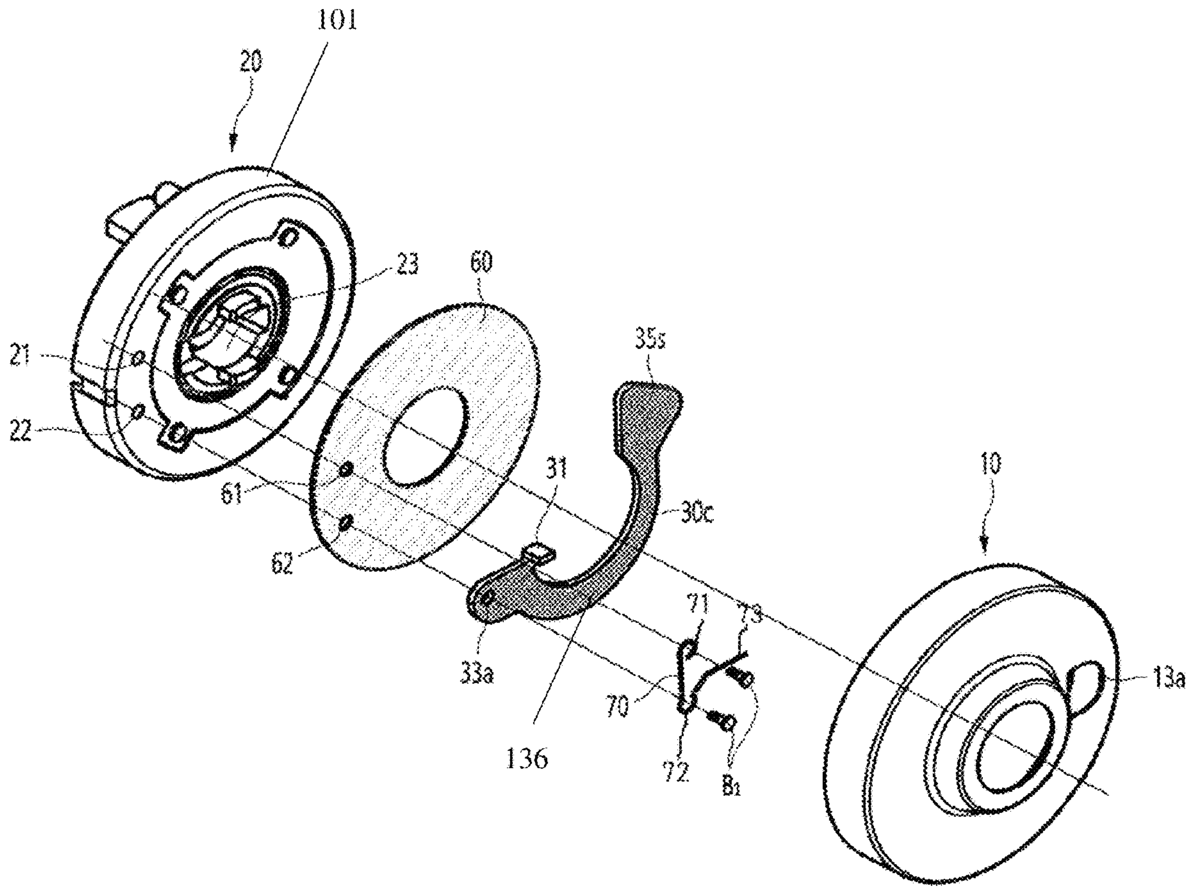
FIG. 14 is an exploded view of the indicator type door lock according to yet another illustrative embodiment.

Referring to FIG. 14, a single display member 30*c* is provided as the indicator member. Particularly, FIG. 14 shows an exploded view of the indicating mechanism of a cylinder door lock configured to indicate the lock status of the door lock. The collar portion 101 of door lock main body 20 is configured to extend at least in part into the cylindrical aperture of a door. The collar portion 101 of door lock main body 20 is configured to abut the interior surface of the door and comprises mounting features for the door lock and the indicating mechanism. A cylindrical channel 23 extends through the door lock main body 20 such that other components of the door lock can operatively connect, such as an interior handle and an exterior handle (e.g., via a spindle). A display plate 60, herein configured as the unlocked indicator is coupled to the exterior facing portion of collar portion 101 of door lock main body 20. In this embodiment, the display plate 60 is annularly shaped such that it does not block the cylindrical channel 23 extending through the door lock main body 20 or interfere with components configured to extend through the cylindrical channel 23. An indicator region 35*s*, herein configured as the locked indicator, is pivotably mounted to the body 20 at a connection point 33*a*, which may serve as a pivot point. The display member 30*c* comprises an arcuate arm 136 such that the indicator does not block the cylindrical channel 23 extending through the lock body 20 or interfere with components configured to extend through the cylindrical channel 23. In this embodiment, both the display member 30*c* and the display plate 60 share mounting hardware, but only display member 30*c* that is configured to move. In the depicted embodiment, threaded fasteners are used as mounting hardware, however it should be appreciated that any alternative means of attachment may be used (e.g., press fits, rivets, etc.). Display plate 60 is configured to remain static relative to the lock body 20 and does not move as the lock transitions from the locked to the unlocked state or from the unlocked to the locked state. A pin spring 70 is operatively connected to the display member 30*c* via the same mounting hardware. This spring is configured to bias the display member 30*c* towards a first, unlocked indicating position. A locking mechanism may be configured to extend at least partially into the cylindrical channel 23.

While not shown in this exploded view, it should be appreciated that the locking mechanism may be operatively connected to an interior handle, such that the door can be opened from an interior of an entryway, and a lock button such that the door can be transitioned from an unlocked state to a locked state and from a locked state to an unlocked state from the interior of the entryway. Additionally, the locking mechanism may be operatively connected to an exterior handle, such that the door can opened from an exterior of the entryway, and a keyway, such that the door can be transitioned from an unlocked state to a locked state and from a locked state to an unlocked state from the exterior of the entryway. While the depicted embodiments show the door lock to include an interior lock button and an exterior keyway, it should be appreciated that any lock configuration (e.g., interior keyway, interior push button, interior turn button, exterior hole, etc.) may be used. The locking mechanism may also include an actuator, such as a tooth, which extends outwards from an exterior surface of the locking mechanism. The tooth may be configured to interface with and apply a force to an interfacing surface of the display member 30*c* such that the display member 30*c* pivots about connection point 33*a* against the biasing force of pin spring 70.

The display plate 60 is mounted in front of the door lock body 20, and the single display member 30*c* is pivotably installed in front of the display plate 60. Also, as in the above-described embodiment, one display opening 13*a* is formed in the main body cover 10.

Herein, the first mounting hole 21 and the second mounting hole 22 are formed in the door lock main body 20. In addition, the first through hole 61 and the second through hole 62 are formed in the display plate 60 to correspond to the first mounting hole 21 and the second mounting hole 22, respectively. The indicator region 35*s* is formed at the front end of the single display member 30*c*, and a single connection hole 33*a* is formed at an end of the single display member 30*c*.

Meanwhile, the pin spring 70 is fixed to the door lock main body 20 through a plurality of bolts B1. That is, the bolts B1 are inserted into the first connection area 71 and the second connection area 72 of the pin spring 70, respectively. At this time, one bolt passes through the first through hole 61 of the display plate 60, and another bolt sequentially passes through the single connection hole 33*a* of the single display member 30*c* and the second through hole 62 of the display plate 60, so that they are fastened to the first mounting hole 21 and the second mounting hole 22 of the door lock main body 20, respectively.

Accordingly, the single display member 30*c* is pivotably installed about the single connection hole 30*a* by a certain angle. Also, the pin spring 70 is disposed such that the support end 73 elastically supports the connection end 31 of the single display member 30*c*. Therefore, even when the single display member 30*c* has been pivoted in one direction, for example as shown in FIGS. 16A-16B, it may be returned to the original state by the elastic force of the pin spring 70.

Figure 15A:
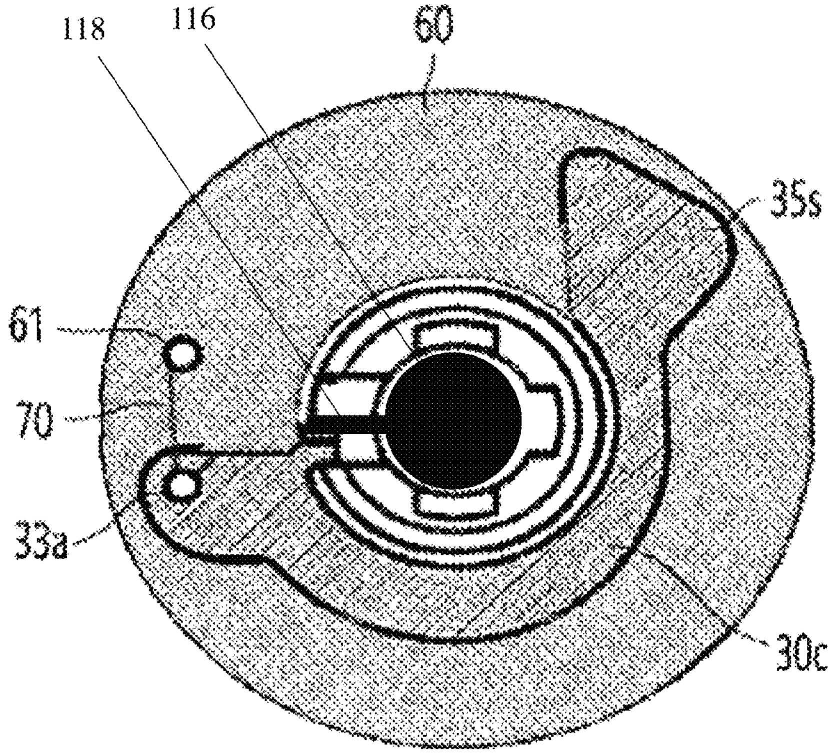
FIGS. 15A-16B are drawings showing the use of the indicator type door lock according to the embodiment of FIG. 14.
Figure 15B:
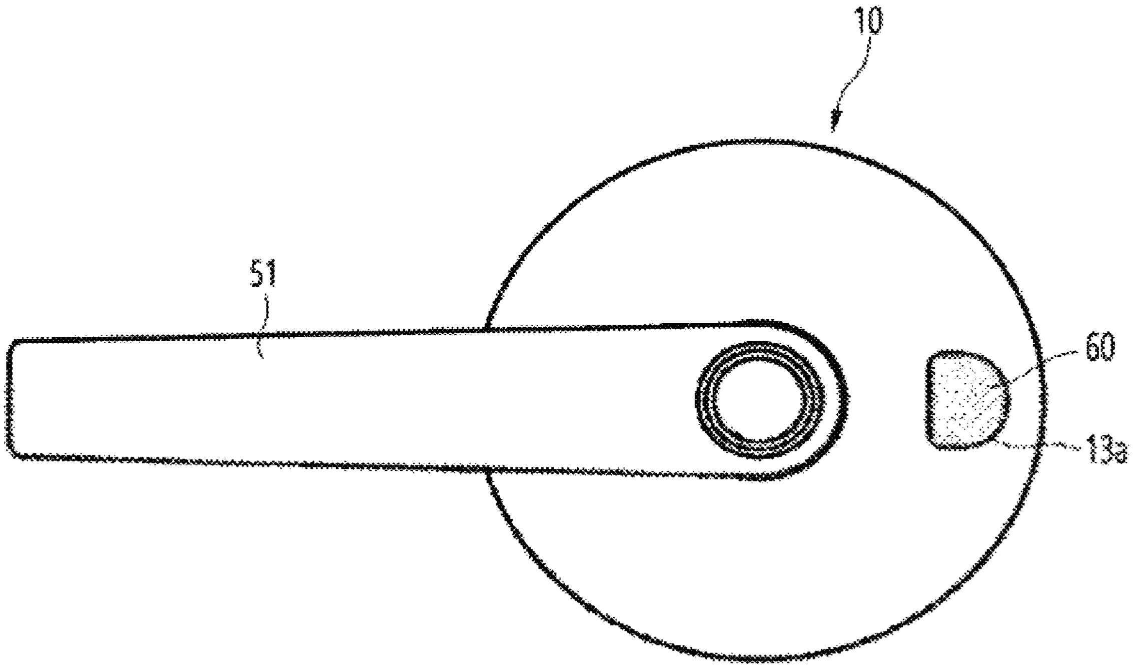

Referring to FIGS. 15A-15B, in a usual state in which the single display member 30*c* is not pivoted, a part of the front surface of the display plate 60 is exposed through the display opening 13*a* of the main body cover 10 (e.g., as shown in FIG. 15B).

Particularly, FIG. 15B shows the indicating mechanism of the door lock in the unlocked indicating position and FIG. 15A shows the interior portions of the door lock in the unlocked indicating position. As described herein, in such a position the tooth 118 of the locking mechanism 116 is in a first position (e.g., at the 9 o'clock position). When oriented as such, the pin spring 70 holds the display member 30*c*, herein configured as the locked indicator, in a first position. In this position, neither the arcuate arm 136 nor the elongated head of the display member 30*c* are visible through the display window 13*a*, as shown best in FIG. 15B.

Figure 16A:
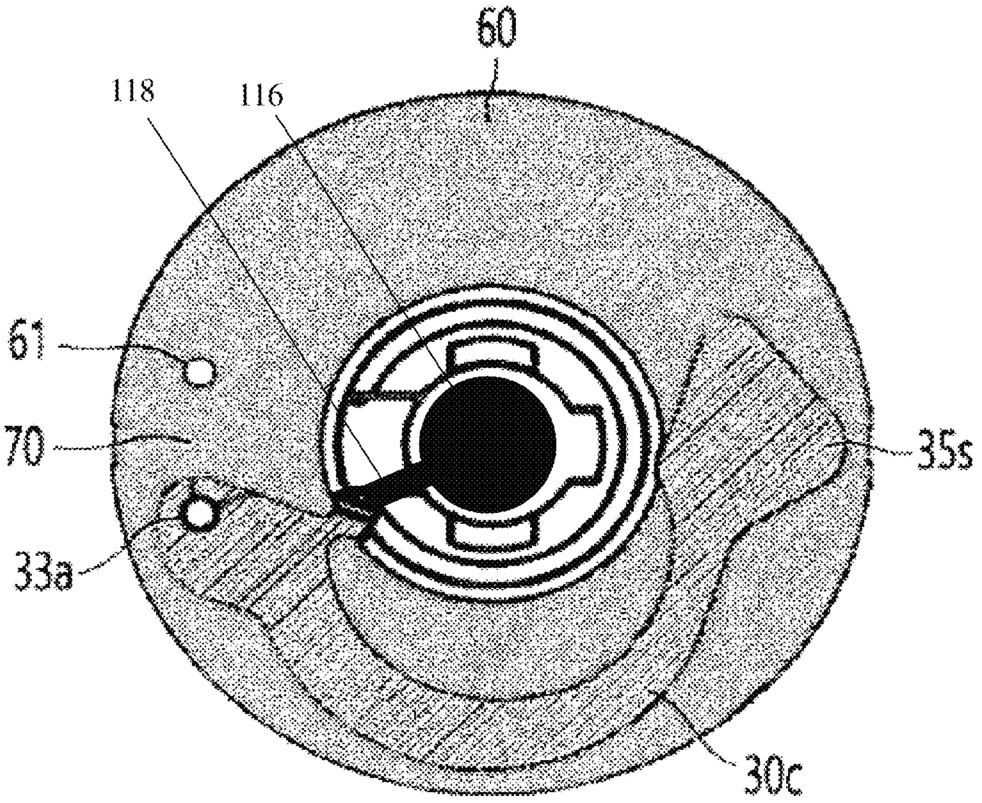
Figure 16B:
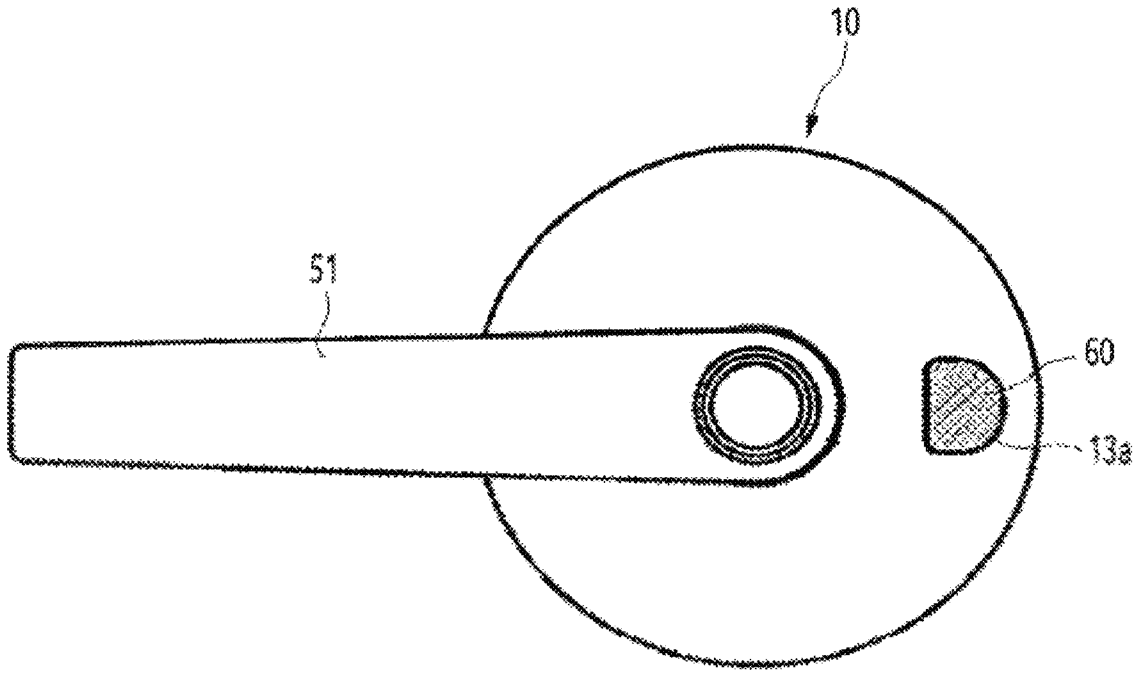

FIG. 16B shows the indicating mechanism of the door lock in the locked indicating position and FIG. 16A shows the interior portions of the door lock in the locked indicating position. As shown in FIG. 16A, the tooth 118 of the locking mechanism 116 is in a second position (e.g., the 8 o'clock position). In this embodiment, the second position is achieved when the locking mechanism 116 is transitioned to the locked state, which involves rotating an actuator of the locking mechanism 116 in a counterclockwise direction (e.g., via a lock button as described herein). When oriented as such, the tooth 118 holds the display member 30*c*, herein configured as the locked indicator, in a second position against the force of pin spring 70. In this position, the elongated head of the display member 30*c* is visible through the display opening 13*a*, as shown best in FIG. 16B.

Referring to FIGS. 16A-16B, when the single display member 30*c* is pivoted clockwise from the state of FIGS. 15A-15B, the indicator region 35*s* of the single display member 30*c* is exposed through the display opening 13*a* of the main body cover 10 (e.g., as shown in FIG. 16B). In some embodiments, indicator region 35*s* is disposed on an elongate head of display member 30*c*.

Thus, according to this embodiment, there is an advantage that the structure may be simplified by applying the single display member 30*c* as the indicator member.

Figure 17:
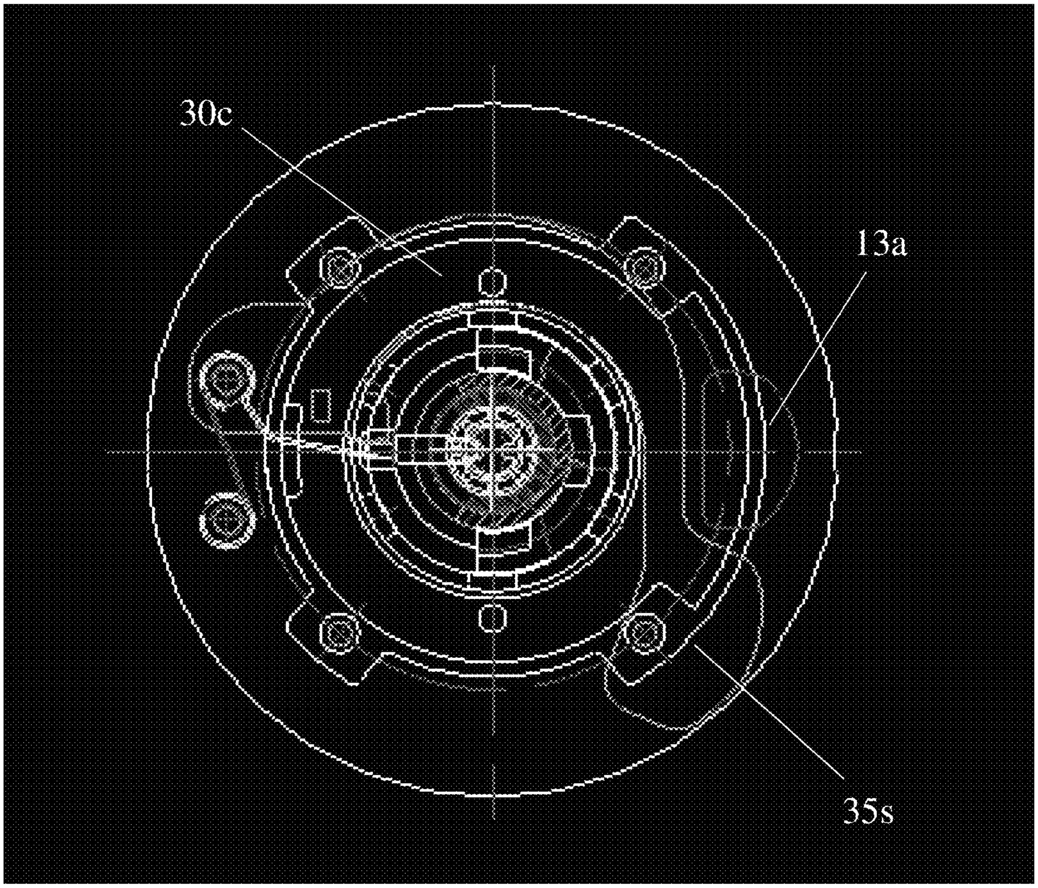
FIG. 17 is a front view of the indicator type door lock according to the embodiment of FIG. 14 in an alternative configuration.

It should be appreciated that in such embodiments the internal components of the door lock may be arranged in any suitable configuration. For example, FIGS. 15A and 16A show a configuration where the door lock is transitioned from the unlocked state to the locked state when the locking mechanism 116 is actuated in a counterclockwise fashion, as described in greater detail herein. In such embodiments, display member 30*c* is positioned in a bottom region of the door lock, as shown in FIGS. 15A and 16A. However, the internal components of the door lock may be adapted to allow the display member 30*c* to function in other applications, such as in door locks that are actuated in a clockwise fashion. Particularly, FIG. 17 depicts one such embodiment. In such an embodiment, display member 30*c* is reoriented to be located in a top region of the door lock. In this configuration, display member 30*c* may be arranged to move in a fashion opposite to the embodiment shown in FIGS. 15A-16B (e.g., being driven by a tooth attached to a spindle), thus moving indicating portion 35*s* of display member 30*c* into a position such that indication portion 35*s* is visible through display opening 13*a*, when the locking mechanism of the door lock is turned clockwise (e.g., from a 9 o'clock position to a 10 o'clock position). Alternatively or additionally, display member 30*c* may be relocated to support door locks having display opening 13*a* in any number of possible location, including on a right hand side portion of the door lock (as depicted), a left hand side portion of the door lock, a top portion, of the door lock, a bottom portion of the door lock, or any other suitable location. Of course, the internal components of the door lock may be configured in any suitable manner, depending on the application.

Figure 18:
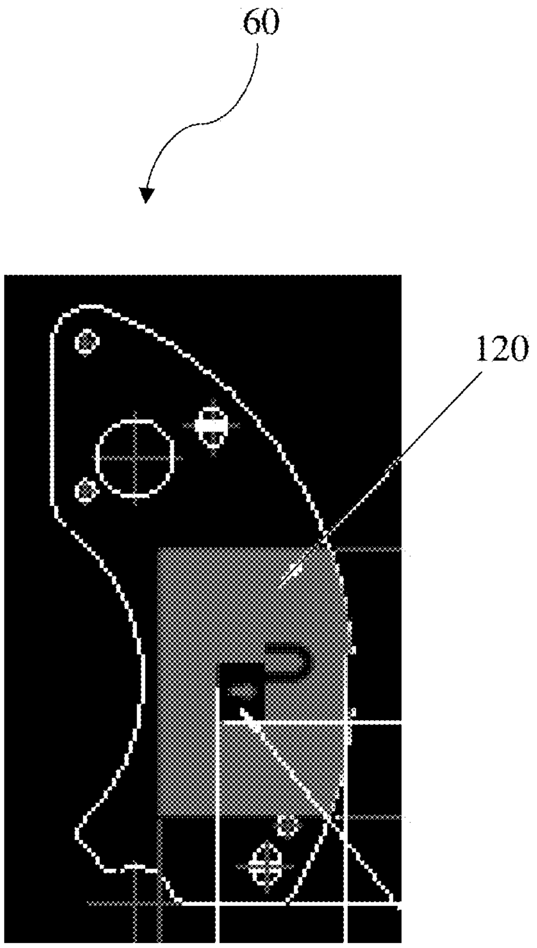
FIG. 18 is a front view of an indicator of an indicator type door lock according to one illustrative embodiment.

It should also be appreciated that display plate 60 may be formed in any suitable manner. For example, as shown in FIG. 14, display plate 60 may be formed as a generally circular or annular plate. However, this need not be the case as other suitable shapes for display plate 60 are also contemplated. Alternatively, as shown in FIG. 18, display plate 60 may take on a generally crescent shape. In some embodiments, display plate 60 may include an indicating region 120 to provide an indication related to the status of the lock (e.g., to show that the door lock is in an unlocked state as described herein). The indicating region may be shaped in a manner complementary to the shape of display opening 13*a*. As shown in FIG. 18, the indication displayed in indicator region 120 may be any suitable indication, such as a lock icon, though other indications are also contemplated (e.g., color codes, letters, and/or words). In some embodiments, the indication is printed directly on the plate. In the illustrated embodiment, display plate 60 is formed from a clear plastic material (e.g., acrylic, polycarbonate, polyvinyl chloride, etc.). However, it should be appreciated that display plate 60 may be formed of other suitable materials including metals and/or composites. Of course, display plate 60 may be made from any suitable material, depending on the application.

Figure 19:
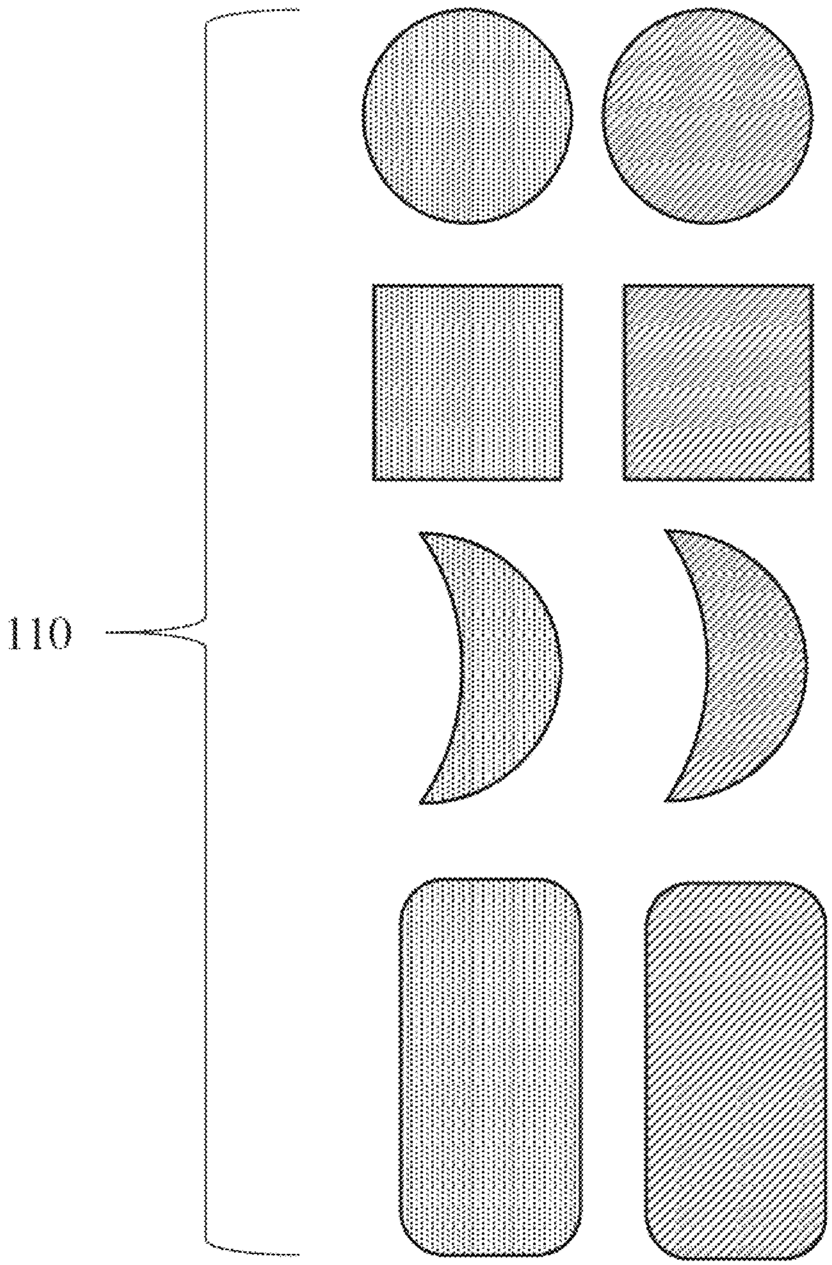
FIG. 19 shows alternative window shapes that could be used on a cylindrical door lock with indicator.

FIG. 19 shows alternate configurations 110 of display opening 13*a*. As shown, display opening 13*a* may be circular, square, crescent shaped, or rectangular. In some instances, the display opening may have sharp, angled edges or rounded edges. Alternatively, any other shape may be used as the disclosure is not limited in this respect. While one display opening is shown, it should be appreciated that any number of display openings arranged in any suitable locations may be used. The display openings 13*a* may be of any size such that persons near the door can quickly ascertain the status of the door lock. In some instances, the indicating regions of display plate 60 and/or display member 30*c* may take on a shape complementary to the shape of display opening 13*a*. Of course, display opening 13*a*, display plate 60, display member 30*c*, and/or the indicating regions thereof may take on any suitable shape, depending on the application.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a “user.” It should be appreciated that a “user” need not be a single individual, and that in some embodiments, actions attributable to a “user” may be performed by a team of individuals and/or an individual in combination with computer-assisted tools or other mechanisms.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of “including,” “comprising,” or “having,” “containing,” “involving,” and variations thereof herein, is meant to encompass the items listed thereafter and equivalents thereof as well as additional items.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An indicator type door lock comprising:

a handle shaft having a handle for unlocking and a push button for locking;

a driving body mounted with the handle shaft;

a door lock main body having a main body cover with a display portion displaying a locked state of the indicator type door lock to an outside, and installed in front of the driving body;

an indicator member installed within the door lock main body to be moved to a certain position, and being exposed through the display portion; and a turning drive member located within the handle shaft and rotated inside the handle shaft when the push button is pressed to move the indicator member;

wherein the turning drive member comprises:

a cam portion moving in a straight direction in the handle shaft by the push button and having a cam post formed on its front surface; and a pin rotator having at least one guide rib guided along the cam post of the cam portion on an inner circumferential surface thereof and a driving pin mounted on an outer circumferential surface thereof to move the indicator member to one side.

2. The indicator type door lock according to claim 1, wherein the indicator member comprises:

a first display member where one end is pivotably mounted on the door lock main body, and a second display member where one end is pivotably mounted on the door lock main body and is pivoted in a direction opposite to the first display member about a pivot point in conjunction with the first display member.

3. The indicator type door lock according to claim 1, wherein the display portion is provided in a shape in which a portion of the main body cover is penetrated, the indicator member is exposed to the outside through penetrated area of the display portion.

4. The indicator type door lock according to claim 2, wherein a pin spring is installed in the pivot point of the first display member and the second display member to apply an elastic force between the first display member and the second display member.

5. The indicator type door lock according to claim 2, any one of the first display member and the second display member further comprises an indicator region integrally extending from an end of the first display member or the second display member.

6. The indicator type door lock according to claim 3, wherein the door lock main body has a display plate marked with at least one display letter, the indicator member is pivotally mounted in the front of the display plate.

* * * * *